US009721613B2

(12) United States Patent
Yamaji et al.

(10) Patent No.: US 9,721,613 B2
(45) Date of Patent: Aug. 1, 2017

(54) CONTENT MANAGEMENT SYSTEM, MANAGEMENT CONTENT GENERATION METHOD, MANAGEMENT CONTENT REPRODUCTION METHOD, PROGRAM AND RECORDING MEDIUM

(71) Applicant: FUJIFILM Corporation, Tokyo (JP)

(72) Inventors: Kei Yamaji, Tokyo (JP); Keiichi Yoshihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 55 days.

(21) Appl. No.: 14/608,212

(22) Filed: Jan. 29, 2015

(65) Prior Publication Data

US 2015/0221343 A1     Aug. 6, 2015

(30) Foreign Application Priority Data

Feb. 5, 2014    (JP) ................................ 2014-020812
Sep. 12, 2014   (JP) ................................ 2014-186374

(51) Int. Cl.
*G11B 27/28*     (2006.01)
*G11B 27/034*    (2006.01)
*G11B 27/34*     (2006.01)
*G11B 27/031*    (2006.01)
(Continued)

(52) U.S. Cl.
CPC ........ *G11B 27/28* (2013.01); *G06F 17/30831* (2013.01); *G11B 27/031* (2013.01);
(Continued)

(58) Field of Classification Search
CPC ....... G11B 27/28; G11B 27/034; G11B 27/34; G11B 27/031; G11B 27/11; G06F 17/30831
(Continued)

(56) References Cited

U.S. PATENT DOCUMENTS 6,101,292 A    8/2000   Udagawa et al.
7,685,428 B2   3/2010   Piersol
(Continued)

FOREIGN PATENT DOCUMENTS

| EP | 1507262 | 2/2005 |
| JP | 9-22469 | 1/1997 |
| JP | 2006-127476 | 5/2006 |
| JP | 2007-189324 | 7/2007 |

OTHER PUBLICATIONS

Extended European Search Report dated Jul. 3, 2015; Application No. 15153314.8-1903.
European Official Action—Sep. 15, 2016.
Chinese Office Action dated Aug. 25, 2016 in corresponding Chinese Application No. 201510050189.X.

*Primary Examiner* — Thai Tran
*Assistant Examiner* — Nien-Ru Yang
(74) *Attorney, Agent, or Firm* — Young & Thompson

(57) ABSTRACT

In a content management system, a still image generation unit generates at least one piece of still image data based on moving image data. A still image selection unit causes a user to select one piece of still image data from among the generated at least one piece of still image data. A management marker registration unit registers the selected still image data or information based on the selected still image data as a management marker in association with the moving image data. An access key issuing unit issues an access key for accessing the moving image data. And a management image generation unit generates management image data including the still image data and the access key.

22 Claims, 18 Drawing Sheets

(51) Int. Cl.
*G11B 27/11* (2006.01)
*H04N 1/00* (2006.01)
*G06F 17/30* (2006.01)
*H04N 1/387* (2006.01)

(52) U.S. Cl.
CPC ............ *G11B 27/034* (2013.01); *G11B 27/11* (2013.01); *G11B 27/34* (2013.01); *H04N 1/00132* (2013.01); *H04N 1/387* (2013.01)

(58) Field of Classification Search
USPC ........................................................ 386/241
See application file for complete search history.

(56) References Cited

U.S. PATENT DOCUMENTS

| | | |
|---|---|---|
| 2005/0201628 A1* | 9/2005 | Tojo .................. G06F 17/30843 382/239 |
| 2006/0034518 A1 | 2/2006 | McDonnell et al. |
| 2007/0101268 A1 | 5/2007 | Hua et al. |
| 2007/0106675 A1* | 5/2007 | Watanabe ............ G11B 27/322 |
| 2007/0172206 A1* | 7/2007 | Yashiro ................ G11B 27/034 386/230 |
| 2007/0174918 A1 | 7/2007 | Hirose et al. |

* cited by examiner

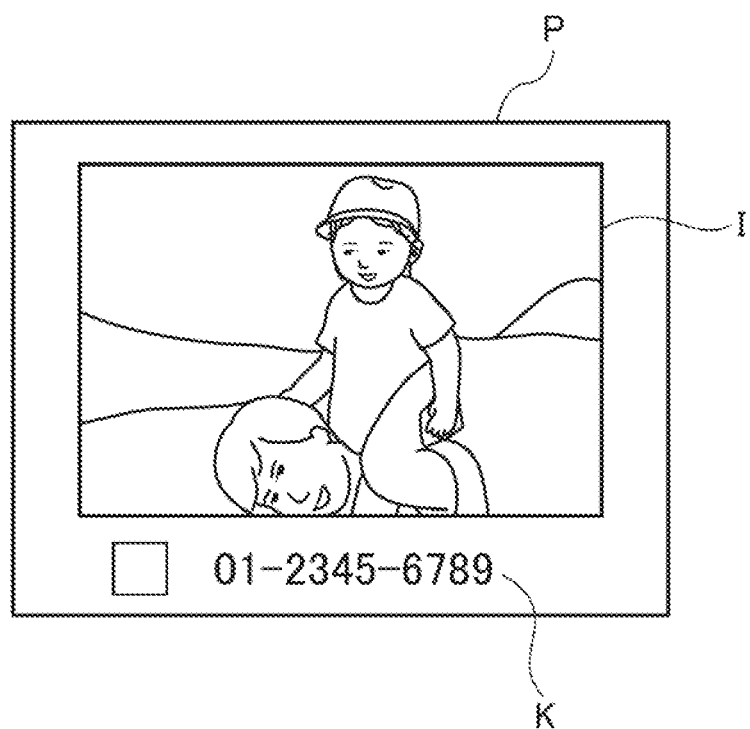

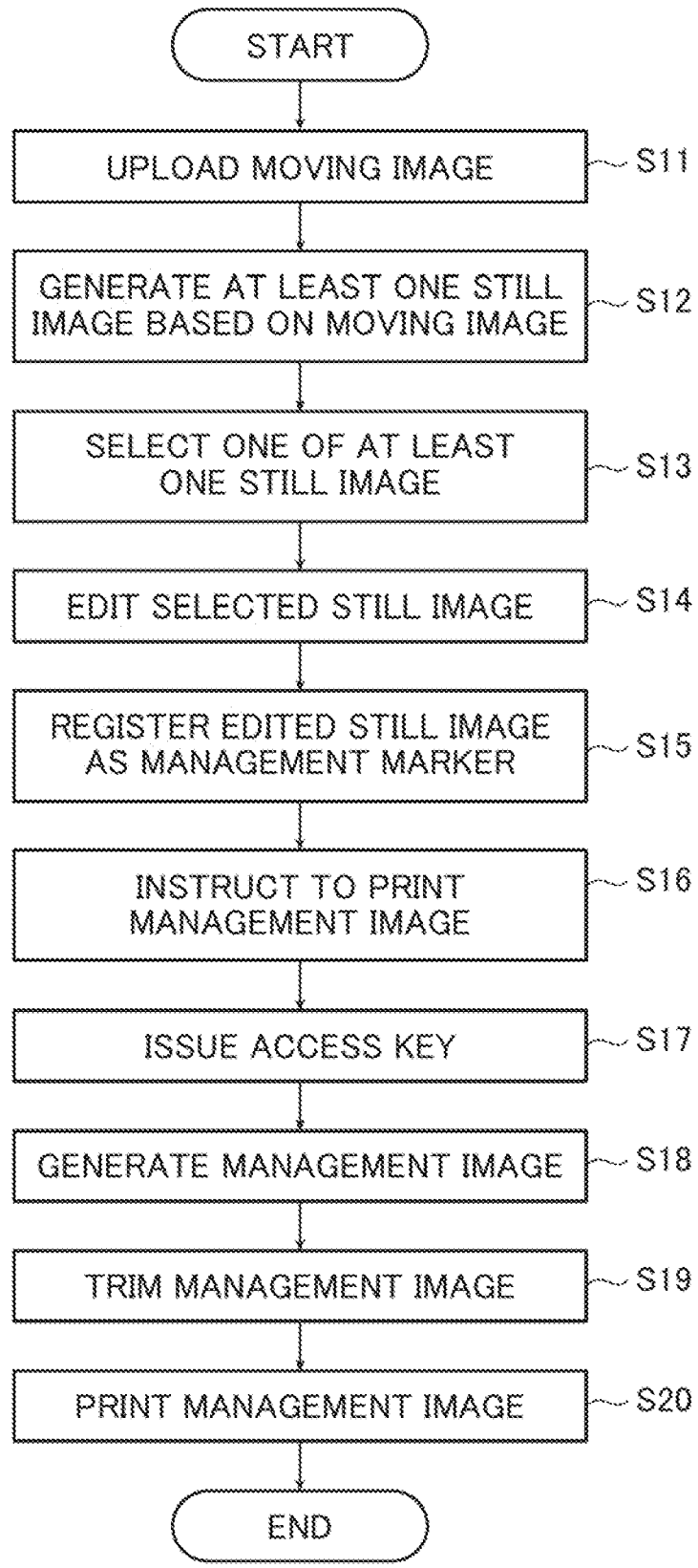

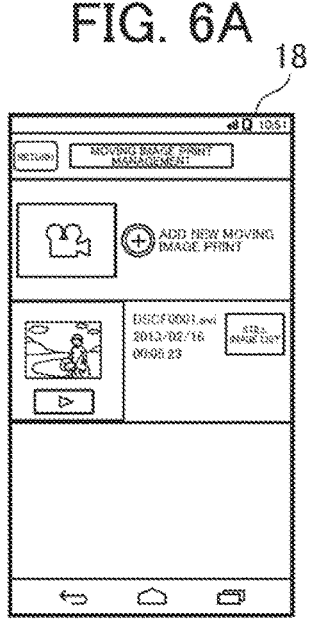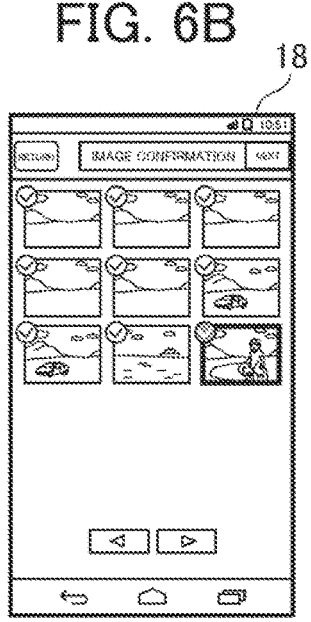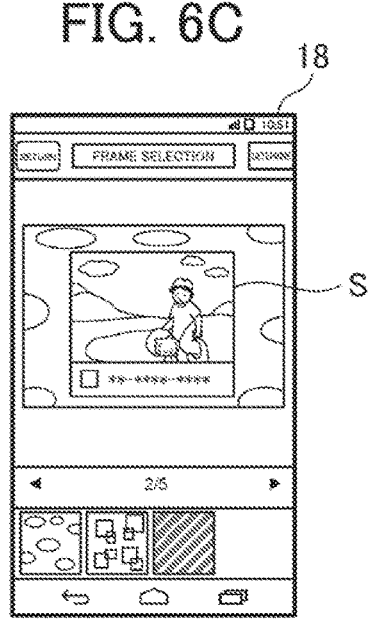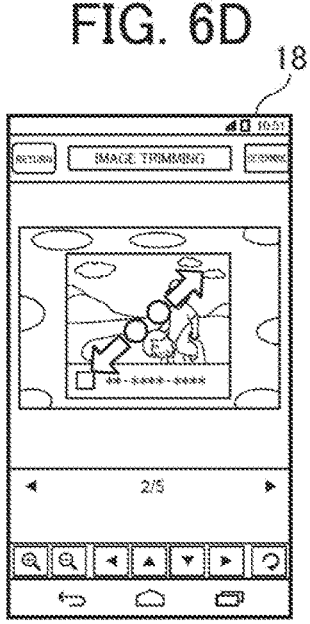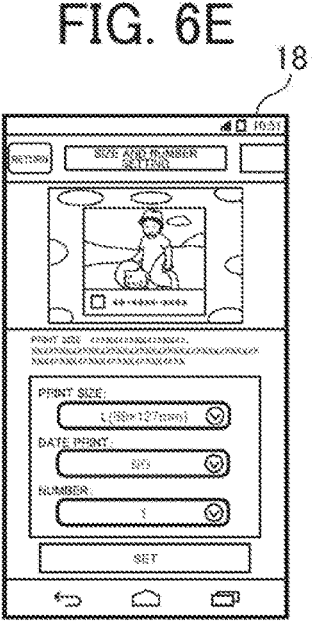

PI

F-DSC

F-KG

FIG. 13A
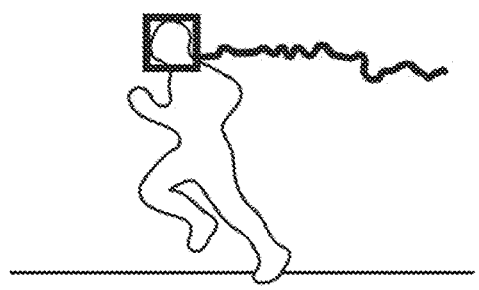 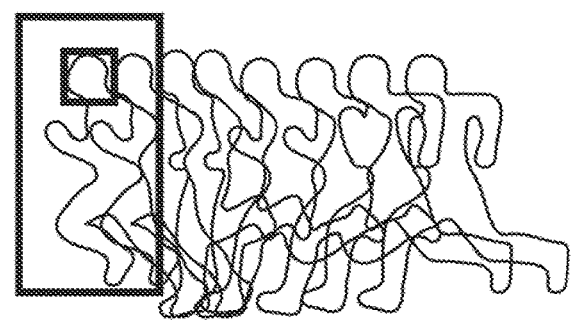
FIG. 13B
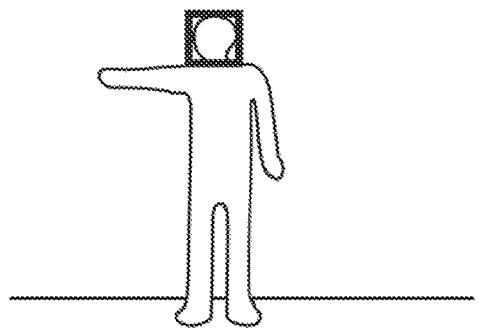 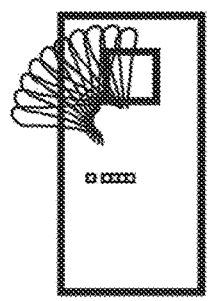
FIG. 13C
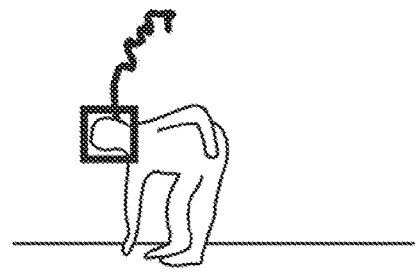 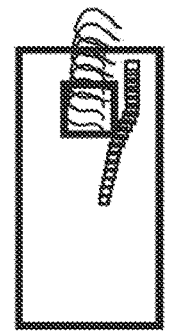

FIG. 22
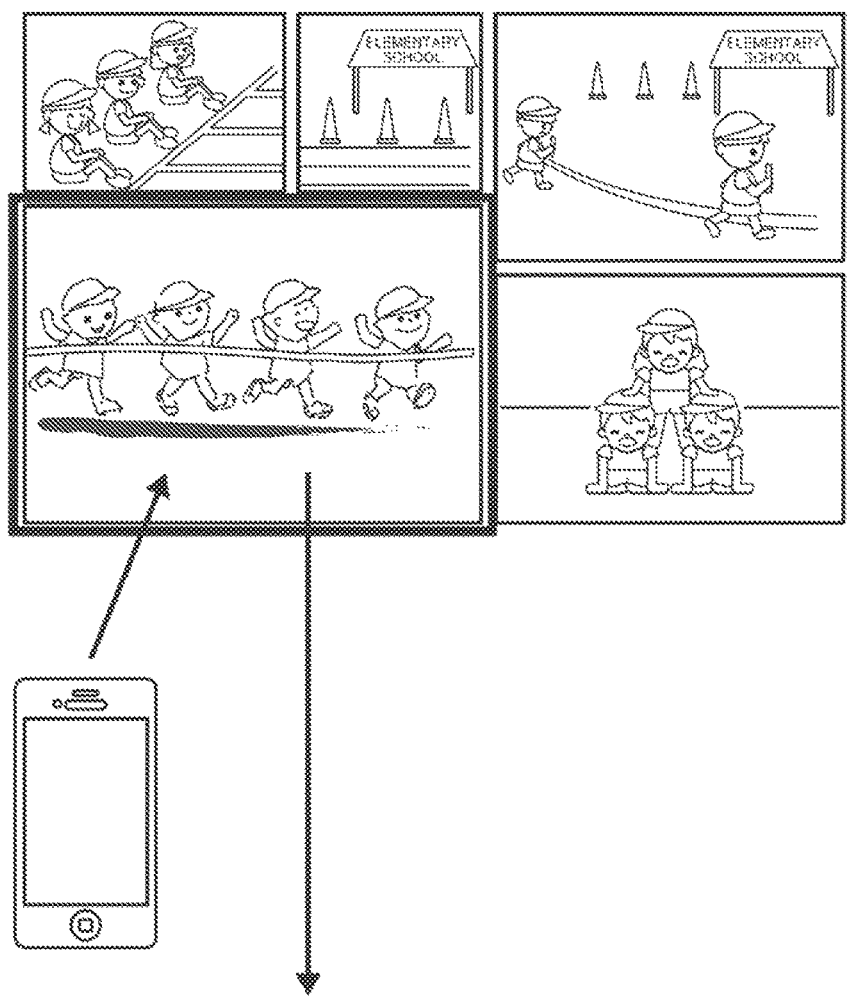
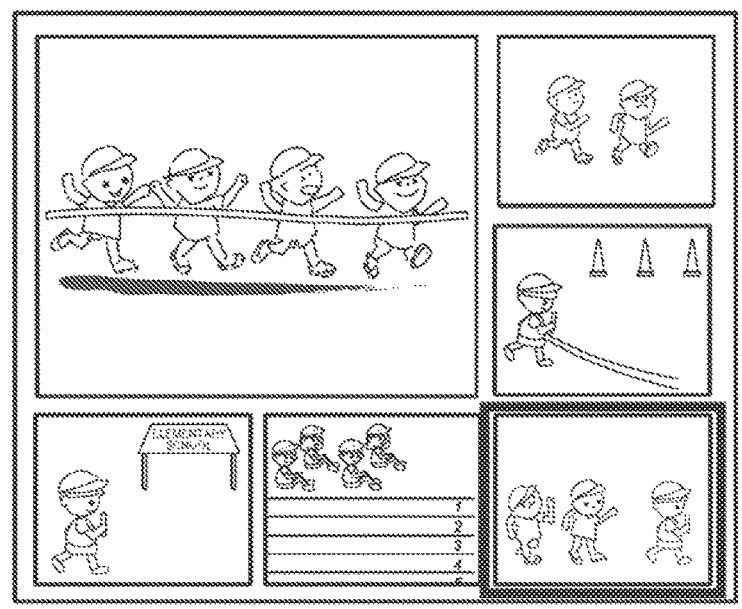

CONTENT MANAGEMENT SYSTEM, MANAGEMENT CONTENT GENERATION METHOD, MANAGEMENT CONTENT REPRODUCTION METHOD, PROGRAM AND RECORDING MEDIUM

CROSS-REFERENCE TO RELATED APPLICATIONS

The present application claims priority under 35 U.S.C. §119 to Japanese Patent Application No. 2014-020812, filed Feb. 5, 2014 and Japanese Patent Application No. 2014-186374, filed Sep. 12, 2014. Each of the above applications is hereby expressly incorporated by reference, in its entirety, into the present application.

BACKGROUND OF THE INVENTION

The present invention relates to a content management system that manages content such as a still image, a moving image, and the like, a management content generation method, a management content reproduction method, a program, and a recording medium.

A system using an augmented reality (AR) technology for displaying an imaged print or the like on a display unit of an information terminal, such as a smartphone, by imaging (capturing) the print or the like having a predetermined marker using the information terminal, and reproducing content such as a predetermined moving image or music in a display portion of the print or the like displayed on the display unit of the information terminal has been conventionally known.

Further, Patent Document 1 (JP 2006-127476 A) discloses a method of managing a library of images, in which an index print including images and a plurality of memory tags corresponding to the images, and a reading/writing device that performs reading of information from the memory tag or writing of information to the memory tag are used.

Patent Document 2 (JP 2007-189324 A) discloses a still image extraction system that extracts still image data from moving image data, and Patient Document 3 (JP 9-22469 A) discloses an image processing device that generates a small amount of standard image data from moving image data.

SUMMARY OF THE INVENTION

The above-described systems using AR technology are mainly used as an advertisement of sales promotion materials or the like, and an attempt of a general user to create content (AR content) using the AR technology has not become widespread yet.

For example, AR content that is a combination of a still image and a moving image may be generated by using the index print and the read/write device disclosed in Patent Document 1, and the still image extraction system disclosed in Patent Document 2 or the image processing device disclosed in Patent Document 3. However, a series of complicated processes such as extraction of still image data from moving image data, generation of a marker, and association of the still image data with the moving image data are necessary for generation of the AR content, and these series of processes in the generation of the AR content obstruct the use of the AR technology by a general user.

An object of the present invention is to provide a content management system, a management content generation method, a management content reproduction method, a program and a recording medium that make it possible for a user to easily generate, reproduce and manage content using an AR technology in a short time without performing a series of complicated processes such as an explicit creation of a marker for management or an explicit registration of content corresponding to the marker for management.

In order to achieve the above object, the present invention provides a content management system comprising:
a still image generation unit configured to generate at least one piece of still image data based on moving image data;
a still image selection unit configured to cause a user to select one piece of still image data from among the at least one piece of still image data generated in the still image generation unit;
a management marker registration unit configured to register the still image data selected in the still image selection unit or information based on the still image data as a management marker in association with the moving image data;
a storage unit configured to store the moving image data;
an access key issuing unit configured to issue an access key for accessing the moving image data stored in the storage unit; and
a management image generation unit configured to generate management image data including the still image data and the access key.

Also, the present invention provides a content management system that manages management content including a management image and moving image data associated with the management image, the system comprising:
a still image generation unit configured to generate at least two pieces of still image data based on the moving image data;
a still image selection unit configured to cause a user to select two or more pieces of still image data among the at least two pieces of still image data generated in the still image generation unit, as output still image data;
a scene discrimination unit configured to discriminate a scene of the moving image corresponding to the moving image data, the moving image including an output still image corresponding to the output still image data, for each of the two or more pieces of output still image data;
a management marker registration unit configured to register an image feature amount of each of the two or more pieces of output still image data or each of two or more output still images corresponding to the two or more pieces of output still image data, as a management marker, in association with moving image data of the scene of the moving image corresponding to each of the two or more output still images;
a storage unit configured to store the moving image data;
an access key issuing unit configured to issue an access key for accessing the moving image data stored in the storage unit; and
a management image generation unit configured to generate management image data including the at least two pieces of output still image data and the access key.

Also, the present invention provides a method of generating management content including a management image and moving image data associated with the management image, the method comprising:
generating at least one piece of still image data based on the moving image data;
causing a user to select one piece of still image data from among the at least one generated still image data;
registering the selected still image data or information based on the selected still image data as a management marker in association with the moving image data;

issuing an access key enabling access to the moving image data based on an instruction from the user; and generating the management image including the still image data and the access key.

Also, the present invention provides a management content reproduction method that reproduces management content generated using the method of generating management content according to above, the management content reproduction method comprising:

capturing the management image to generate captured image data;

reading the management marker from a captured image based on the captured image data;

inputting the access key described in the management image;

searching for the moving image data corresponding to the management image based on the access key and the management marker; and reproducing the moving image based on the searched moving image data.

Also, the present invention provides a management content reproduction method that reproduces management content generated using the method of generating management content according to above, the management content reproduction method comprising:

capturing the management image to generate captured image data;

reading the management marker from a captured image based on the captured image data;

inputting the access key described in the management image;

searching for the moving image data corresponding to the management image based on the access key and the management marker; and reproducing the moving image based on the searched moving image data.

Also, the present invention provides a method of generating management content including a management image and moving image data associated with the management image, the method comprising:

a step in which a still image generation unit generates at least two pieces of still image data based on the moving image data;

a step in which a still image selection unit causes a user to select two or more pieces of still image data as output still image data from among the at least two pieces of still image data generated in the still image generation unit;

a step in which a scene discrimination unit discriminates a scene of the moving image corresponding so the moving image data, the moving image including the output still image corresponding to the output still image data, for each of the two or more pieces of output still image data;

a step in which a management marker registration unit registers an image feature amount of each of the two or more pieces of output still image data or each of two or more output still images corresponding to the two or more pieces of output still image data, as a management marker, in association with moving image data of the scene of the moving image corresponding to each of the two or more output still images;

a step in which an access key issuing unit issues an access key for accessing the moving image data stored in a storage unit; and a step in which a management image generation unit generates management image data including the at least two pieces of output still image data and the access key.

Also, the present invention provides a management content reproduction method that reproduces management content generated using the method of generating management content according to above, the management content reproduction method comprising:

a step in which an imaging unit captures a print of the management image corresponding to the management image data to generate captured image data;

a step in which a management marker reading unit reads the management marker from a captured image corresponding to the captured image data;

a step in which an operation input unit receives the access key, which is described in the print of the management image, input by a user;

a step in which an image data search unit searches for the moving image data stored in the storage unit based on the management marker and the access key input via the operation input unit; and a step in which when one output still image is captured from among the output still images included in the print of the management image by the imaging unit, a display control unit performs control to reproduce, on a display unit, the scene of the moving image corresponding to the moving image data associated with a management marker read from the captured one output still image by the management marker reading unit from among the moving image data searched by the image data search unit.

Also, the present invention provides a method of generating management content including a management image and moving image data associated with the management image, the method comprising:

a step in which a still image generation unit generates at least two pieces of still image data based on the moving image data;

a step in which a still image selection unit causes a user to select one piece of still image data or two or more pieces of still image data as output still image data from among the at least two pieces of still image data generated in the still image generation unit;

a step in which a scene discrimination unit discriminates a scene of the moving image including the output still image corresponding to the output still image data, for the one output still image data or each of the two or more pieces of output still image data;

a step in which the still image generation unit, the still image selection unit, and the scene discrimination unit repeatedly perform processing on each of the plurality of pieces of moving image data;

a step in which a management marker registration unit registers an image feature amount of each of a plurality of pieces of first output still image data obtained by selecting at least one piece of output still image data from among output still image data corresponding to each of the plurality of pieces of moving image data or each of a plurality of first output still images corresponding to the plurality of pieces of first output still image data, as a first management marker, in association with moving image data of the scene of the moving image corresponding to each of the plurality of first output still images, and for each of a plurality of pieces of moving image data, the management marker registration unit sets the output still image data as second output still image data and registers an image feature amount of a second output still image corresponding to one piece of second output still image data or each of two or more pieces of second output still image data or the one piece of second output still image data or each of the two or more pieces of second output still image data, as a second management marker, in association with moving image data of the scene of the moving image corresponding to one second output still image or each of two or more second output still images;

a step in which an access key issuing unit issues an access key for accessing the moving image data stored in a storage unit; and a step in which a management image generation unit generates first management image data including at least two pieces of first output still image data and the access key, and second management image data including at least one piece of second output still image data for each of the plurality of pieces of moving image data.

Also, the present invention provides a management content reproduction method that reproduces management content generated using the method of generating management content according to above, the method comprising:

a step in which an imaging unit captures a print of a first management image corresponding to the first management image data to generate captured image data;

a step in which a management marker reading unit reads the first management marker from a captured image corresponding to the captured image data;

a step in which an operation input unit receives the access key, which is described in the print of the management image, input by a user;

a step in which an image data search unit searches for the moving image data stored in the storage unit based on the management marker and the access key input via the operation input unit;

a step in which when one first output still image is captured from among the first output still images included in the print of the first management image by the imaging unit, a display control unit performs control to display, on a display unit, a second management image corresponding to the moving image data associated with the first management marker read from the captured one first output still image by the management marker reading unit from among the moving image data searched by the image data search unit;

a step of inputting, via the operation input unit, an instruction to select one second output still image from among the second output still images included in the second management image displayed on the display unit; and a step in which when one second output still image is selected from among the second output still images included in the second management image displayed on the display unit according to the instruction input via the operation input unit, the display control unit performs control to reproduce, on the display unit, the scene of the moving image corresponding to the moving image data associated with the second management marker read from the selected one second output still image by the management marker reading unit from among the moving image data searched by the image data search unit.

Also, the present invention provides a non-transitory computer-readable recording medium having a program recorded thereon, the program causing a computer to execute the respective steps of the management content generation method according to above.

According to the present invention, it is possible for a user to easily generate content using an AR technology in a short time without performing complicated processes, and to simply reproduce the content using the AR technology. Further, according to the present invention, it is possible to greatly reduce the user's labor required for content management.

Moreover, according to the present invention, since the respective output still images included in the print of the management image can be associated with the respective corresponding scenes of the moving image, the output still images included in the print of the management image can be used as indexes of the respective corresponding scenes of the moving image, and a desired scene of the moving image can be reproduced by capturing a desired output still image included in the print of the management image.

Furthermore, according to the present invention, since a plurality of moving images are collected in a print of the first management image, a user can instantaneously grasp a digest of content of the plurality of moving images by viewing the print of the first management image.

BRIEF DESCRIPTION OF THE DRAWINGS

FIG. 4 is a diagram illustrating an example of a management print P.

FIG. 5 is a flowchart illustrating a method of generating the management print P of FIG. 4.

FIGS. 6A to 6E are illustrative diagrams illustrating a user operation when the management print P of FIG. 4 is generated.

FIGS. 13A to 13C are conceptual diagrams illustrating an example of a motion trajectory of a person of interest on the left side, and illustrating an example of a motion history image of the person of interest on the right side.

FIG. 22 is a conceptual diagram illustrating a state in which one first output still image is captured from among first output still images included in a print of a first management image, and then, one second output still image is selected from among second output still images included in a second management image displayed on a display unit.

DETAILED DESCRIPTION OF THE INVENTION

Hereinafter, a content management system, a management content generation method, a management content reproduction method, a program and a recording medium according to the present invention will be described in detail based on preferred embodiments illustrated in the accompanying drawings.

Figure 1:
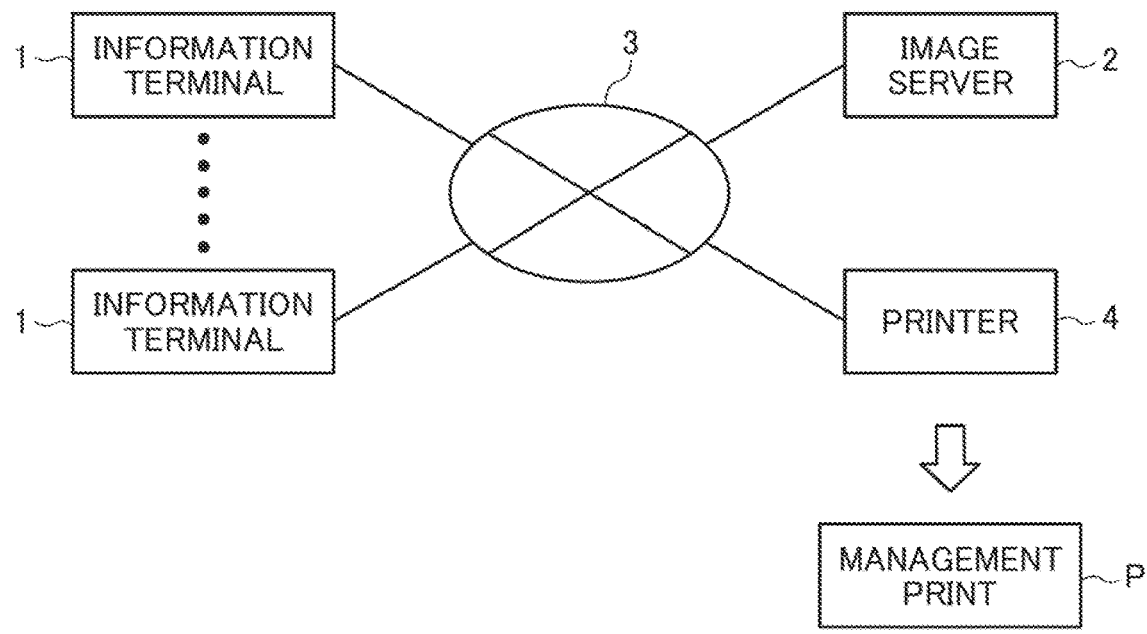
FIG. 1 is a schematic diagram illustrating the entire configuration of a content management system according to an embodiment of the present invention.
Figure 2:
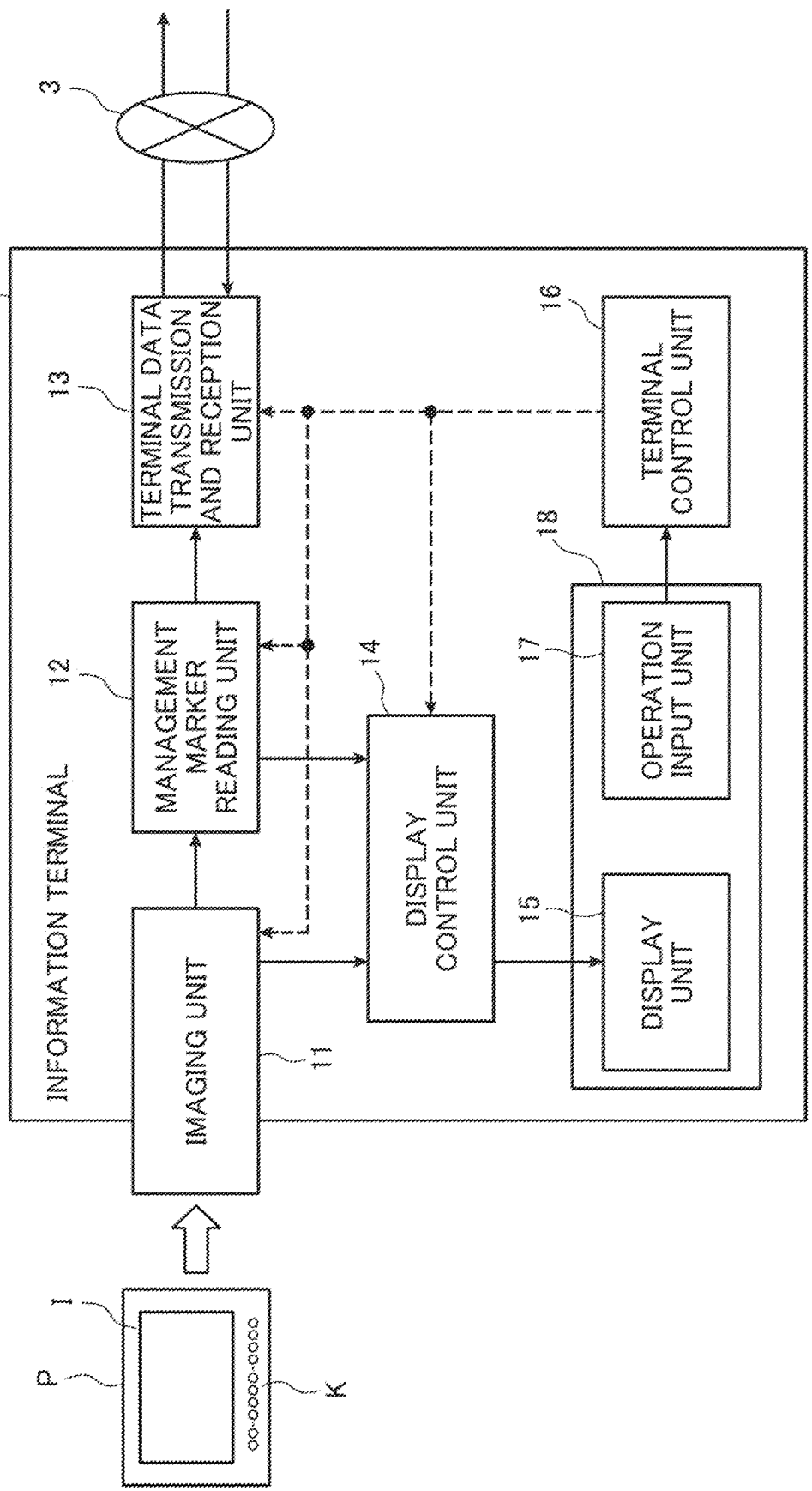
FIG. 2 is a block diagram illustrating a detailed configuration of an information terminal 1 in the content management system of FIG. 1.
Figure 3:
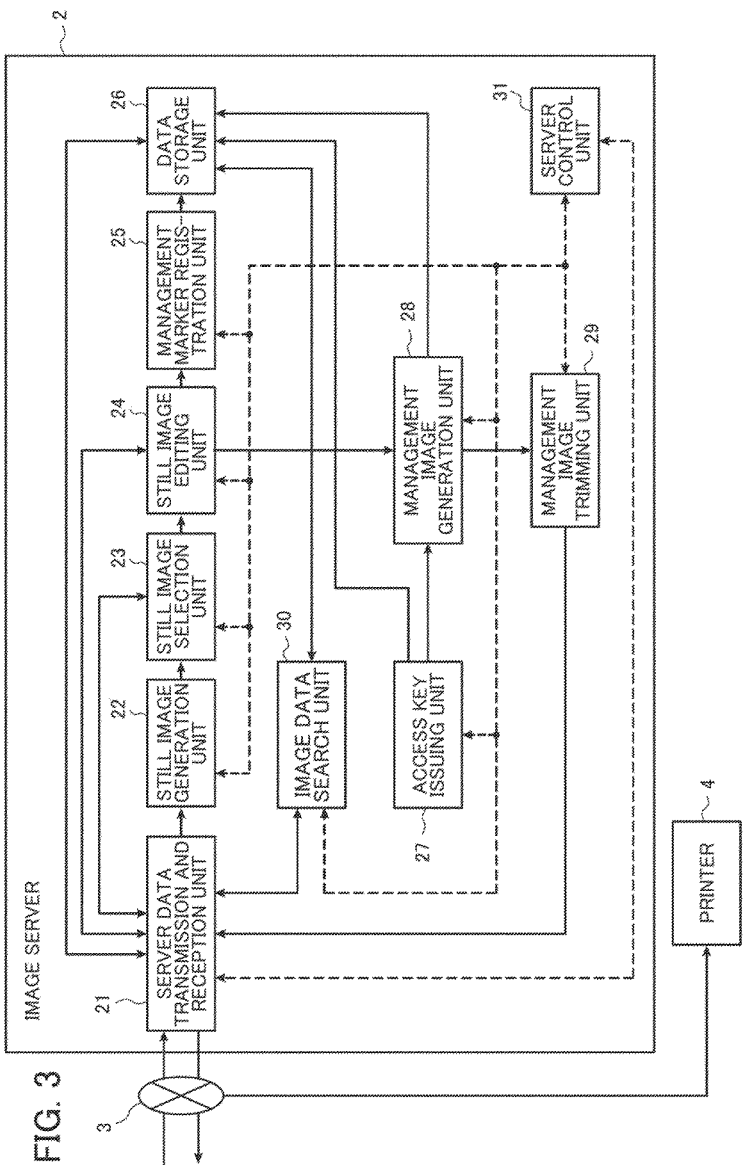
FIG. 3 is a block diagram illustrating a detailed configuration of an image server 2 in the content management system of FIG. 1.

FIG. 1 is a schematic diagram illustrating the entire configuration of a content management system according to an embodiment of the present invention, FIG. 2 is an illustrative diagram illustrating a detailed configuration of an information terminal 1 illustrated in FIG. 1, FIG. 3 is an illustrative diagram illustrating a detailed configuration of an image server 2 illustrated in FIG. 1, and FIG. 4 is an illustrative diagram illustrating a detailed configuration of a content management print (hereinafter referred to as a management print) P illustrated in FIG. 1.

The content management system according to an embodiment of the present invention manages management content including a management image and moving image data associated with the management image, and includes at least one information terminal 1, an image server 2, a communication line 3 that connects the information terminal 1 and the image server 2 to each other, a printer 4 connected to the communication line 3, and a management print P output by the printer 4, as illustrated in FIG. 1.

The information terminal 1 is, for example, a smartphone, a tablet PC, or a laptop PC, and is connected to the communication line 3 in a wired manner or wirelessly.

The image server 2 is, for example, a network server connected to the communication line 3 and performs various data processing based on an instruction from the information terminal 1.

The communication line 3 is, for example, an Internet line, connects the information terminal 1 and the image server 2 to each other, and enables bidirectional communication.

The printer 4 is, for example, a network printer connected to the communication line 3, acquires image data from the image server 2 based on an output instruction from the information terminal 1 or the like, and prints the management print P based on the output instruction and the image data. A display unit that displays an image on a screen based on the image data may be connected to the communication line 3 in place of the printer 4, and each of the printer 4 and the display unit may be connected to the communication line 3.

The management print P is obtained by printing a content management image (hereinafter referred to as a management image) having a still image registered as a content management marker (hereinafter referred to as a management marker) and an access key on a predetermined medium as a commercial image material. Here, the commercial image material is a photo book, a digital camera print, a postcard, a collage, or the like, and may be paid for or free.

FIG. 2 is a block diagram illustrating a detailed configuration of the information terminal 1 in the content management system illustrated in FIG. 1.

The information terminal 1 includes an imaging unit 11, and a management marker reading unit 12 and a terminal data transmission and reception unit 13 that are sequentially connected from the imaging unit 11, as illustrated in FIG. 2. Further, the information terminal 1 includes a display control unit 14 to which the imaging unit 11 and the management marker reading unit 12 is connected, and a display unit 15 to which the display control unit 14 is connected. Further, the information terminal 1 includes a terminal control unit 16 connected to each of the imaging unit 11, the management marker reading unit 12, the terminal data transmission and reception unit 13, and the display control unit 14. An operation input unit 17 is connected to the terminal control unit 16. In the information terminal 1, the display unit 15 and the operation input unit 17 may be integrally formed as a touch panel 18.

The imaging unit 11 includes an imaging optical system such as an optical lens (not illustrated), and an imaging element such as a CCD sensor or a CMOS sensor (not illustrated), performs imaging based on an instruction of a user, and outputs captured image data. The imaging unit 11 of this embodiment captures a still image I of the management print P, and outputs captured image data including the still image I.

The management marker reading unit 12 detects the still image I from the captured image based on the captured image data, reads the management marker from the still image I based on a predetermined algorithm, and outputs the management marker. Here, the management marker is a feature amount of the still image I read from the still image I using a predetermined algorithm, and includes, for example, edge information of a target to be photographed in the still image I.

The terminal data transmission and reception unit 13 transmits data to the image server 2, the printer 4 or the like via the communication line 3, and receives data from the image server 2, the printer 4 or the like via the communication line 3. The transmitted or received data includes still image data and moving image data, an instruction from a user input in the operation input unit 17 of the information terminal 1, responses from the information terminal 1 and the image server 2, or the like.

The display control unit 14 controls the display unit 15 based on the instruction of the terminal control unit 16, and causes the display unit 15 to display a still image, a moving image, or an image used for predetermined operation input.

Here, when the moving image is reproduced on the display unit 15, the display control unit 14 may cause the moving image to be reproduced using AR technology (AR reproduction), or may cause the moving image to be reproduced without using the AR technology (normal reproduction). When the moving image is AR-reproduced, the display control unit 14 performs control so that the imaged (captured) management print P is displayed on the display unit 15 and the moving image is reproduced in a display portion of the still image I of the management print P displayed on the display unit 15. When the moving image is normally reproduced, the display control unit 14 performs control so that the moving image is reproduced on the full screen of the display unit 15 or in a window with an arbitrary size of the display unit 15.

The display unit 15 is configured with, for example, a liquid crystal display or an organic EL display, and displays a still image based on still image data, a moving image based on moving image data and an image used for a predetermined operation input according to an instruction from the display control unit 14.

The terminal control unit 16 controls the respective units of the information terminal 1 based on an instruction of a user, a predetermined program recorded in a memory (not illustrated), or the like.

The operation input unit 17 is configured with, for example, buttons, a keyboard, a mouse, and the like, and outputs an input by a user to the terminal control unit 16 as an input signal. The display unit 15 and the operation input unit 17 may be integrally configured using a touch panel. In this embodiment, the display unit 15 and the operation input unit 17 is configured with a touch panel 18. In this case, the operation input unit 17 includes an operation image displayed on a liquid crystal display or the like, and a touch sensor installed at the upper side of the display unit 15.

FIG. 3 is a block diagram illustrating a detailed configuration of the image server 2 of the content management system illustrated in FIG. 1.

As illustrated in FIG. 3, the image server 2 includes a server data transmission and reception unit 21, and a still image generation unit 22, a still image selection unit 23, a still image editing unit 24, a management marker registration unit 25, and a data storage unit 26 sequentially connected from the server data transmission and reception unit 21. The server data transmission and reception unit 21 and the still image selection unit 23 are connected to each other, and the server data transmission and reception unit 21 is connected to the data storage unit 26. Further, the image server 2 includes an access key issuing unit 27 connected to the data storage unit 26, a management image generation unit 28 connected to the still image editing unit 24 and the access key issuing unit 27 and connected to the data storage unit 26, a management image trimming unit 29 connected to the management image generation unit 28 and connected to the server data transmission and reception unit, and an image data search unit 30 connected to the server data transmission and reception unit 21 and the data storage unit 26. The image server 2 further includes a server control unit 31 connected to each of the server data transmission and reception unit 21, the still image selection unit 23, the still image editing unit 24, the management marker registration unit 25, the access key issuing unit 27, the management image generation unit 28, the management image trimming unit 29, and the image data search unit 30.

The server data transmission and reception unit 21 receives data from the information terminal 1 or the like via the communication line 3, and transmits data to the information terminal 1, the printer 4 or the like via the communication line 3. Similarly to the above, the transmitted and received data includes still image data and moving image data, an instruction from a user input in the operation input unit 17 of the information terminal 1, responses from the information terminal 1 and the image server 2, or the like.

The still image generation unit 22 generates at least one still image from the moving image based on the moving image data and outputs the at least one piece of still image data. If there is no condition that the moving image is an extremely short one, a plurality of still images are usually generated, and the plurality of pieces of still image data are output. The generation of the still image in the still image generation unit 22 is performed, for example, by analyzing the still image constituting each frame of the moving image, detecting color tone, brightness, defocusing, blurring, or the like of the still image, and extracting, for example, still images corresponding to frames before and after color tone or brightness is greatly changed, or a still image having no defocusing or blurring due to appropriate exposure. Further, the size or direction of the face or facial expression (smiling, crying or the like) of a person in the moving image may be detected and the still image may be extracted based thereon. In addition, when sound is attached to the moving image, the still images may be extracted from the moving image before and after a time point (time code) at which the sound becomes large. By extracting the still image from the moving image in the above-described methods, a representative scene of the moving image can be extracted as a still image.

The still image selection unit 23 causes a user to select one piece of still image data from among at least one piece of still image data generated by the still image generation unit 22. For example, the still image selection unit 23 generates thumbnail image data of the at least one piece of still image data, transmits the thumbnail image data from the server data transmission and reception unit 21 to the information terminal 1, causes the thumbnail images of the at least one still image to be displayed on the display unit 15 of the information terminal 1, and causes the user to select a thumbnail image. Information of the thumbnail image selected in the information terminal 1 is transmitted from the terminal data transmission and reception unit 13 of the information terminal 1 to the still image selection unit 23 via the server data transmission and reception unit 21 of the image server 2. The still image selection unit 23 selects one piece of still image data from among at least one piece of still image data based on the information of the selected thumbnail image, and outputs the selected one piece of still image data as selected still image data. Here, the still image data itself, rather than the thumbnail image data, may be transmitted to the information terminal 1.

Based on the instruction of the user, the still image editing unit 24 performs editing processing such as a setting of a background frame, image correction such as color correction, trimming, enlargement and reduction, and rotation on the selected still image based on the selected still image data output from the still image selection unit 23. For example, the still image editing unit 24 transmits the selected still image data to the information terminal 1 via the server data transmission and reception unit 21, causes the selected still image so be displayed on the display unit 15 of the information terminal 1, and causes the user to input the editing processing for the selected still image. The information of the editing processing such as the background frame, the image correction, trimming, enlargement and reduction, and rotation input from the user to the operation input unit 17 is transmitted from the terminal data transmission and reception unit 13 of the information terminal 1 to the still image editing unit 24 via the server data transmission and reception unit 21 of the image server 2. The still image editing unit 24 performs the editing processing on the selected still image based on the input information of the editing processing, and outputs edited still image data. Here, the still image editing unit 24 does not perform the editing processing on the selected still image, but the information terminal 1 may perform the editing processing on the selected still image to generate the edited still image data, and the edited still image data may be transmitted from the information terminal 1 to the image server 2. The editing processing performed on the still image by the still image editing unit 24 is not essential, and no editing processing may be performed and the acquired still image data may be output as it is.

The management marker registration unit 25 registers the edited still image based on the edited still image data output from the still image editing unit 24 as a management marker. For example, the management marker registration unit 25 analyzes the edited still image based on a predetermined algorithm, calculates a feature amount such as information of an edge or positional information of the edge in the edited still image, and registers the feature amount as a management marker of the edited still image in association with the corresponding moving image data. As the management marker is registered in association with the moving image data, the moving image data stored in the data storage unit 26 can be searched by using the management marker as a search condition.

The data storage unit 26 stores, for example, the still image data, the moving image data, and information related thereto, and is configured with, for example, a large-capacity recording medium such as an HDD or an SSD. The moving image data, the management image data and the like are stored in the data storage unit 26 in association with the management marker.

The access key issuing unit 27 receives an output instruction for the management image, issues an access key, and outputs the access key. Here, the access key is information for accessing the corresponding moving image data stored in the data storage unit 26, and comprises, for example, a predetermined character string including figures or letters. Reading of the management marker by the management marker reading unit 12 of the information terminal 1 is based on the captured image captured by the imaging unit 11, and a case in which the management marker is not sufficiently read due to imaging conditions or a case in which the management marker is erroneously read is considered. Therefore, it is possible to prevent erroneous detection of the moving image data based on the management marker by limiting the moving image data to be searched for in advance using the access key. Here, the access key is uniquely determined by a user who uploads the moving image data, and accordingly, the range of moving image data capable of being searched based on the management marker is limited to the range of moving image data uploaded by the user using the access key.

The access key issuing unit 27 may output, for example, as the access key, image data such as a bar code or a two-dimensional code having the above-described information of a predetermined character string. The examples of the output instruction for the management image include an order for a management print, on which a management image is printed, from the user.

The management image generation unit 28 generates a management image based on the edited still image data output from the still image editing unit 24 and the access key output from the access key issuing unit 27, and outputs management image data. Similarly to the corresponding moving image data, the management image data is associated with the management marker and stored in the data storage unit 26. The management marker may be stored in a storage unit different from the data storage unit 26. For example, a configuration, in which the management marker and the access information to the moving image data are associated with each other and stored in a storage unit different from the data storage unit 26, the access information to the moving image data is acquired based on the management marker, and the moving image data stored in the data storage unit 26 is accessed based on the acquired access information, is considered.

The management image trimming unit 29 receives the output instruction for the management image, performs an automatic trimming on the management image depending on an output medium to generate a trimmed management image, and outputs the trimmed management image data. Examples of the output medium include a photographic print having a size such as L, 2L, DSC, or KG, a photo book having a predetermined frame size, and the like.

The image data search unit 30 searches the data storage unit 26 based on the management marker and the access key, and acquires the moving image data associated with the management image. The image data search unit 30 limits the range of the moving image data on which search is performed based on the access key, searches for the moving image data based on the management marker within the limited range of the moving image data, and identifies the moving image data, thus preventing erroneous detection of the moving image data and shortening access time to the moving image data.

The server control unit 31 controls the respective units of the image server 2 based on an instruction of a user from the information terminal 1 or, for example, a predetermined program recorded in a memory (not illustrated).

FIG. 4 is a schematic diagram illustrating an example of the management print P. The management print P is obtained by printing the management image, which has the still image I generated from the moving image and associated with the moving image, and the access key K, on a predetermined medium as a commercial image material.

As described above, the still image I is an edited still image that is selected by a user and subjected to the editing processing by the user. As described above, the access key K is information for accessing the moving image data associated with the still image I, and the access key K illustrated in FIG. 4 comprises a character string of ten digits.

Next, an operation for generating the management print P in the content management system of FIG. 1 will be described. FIG. 5 is a flowchart of an operation of outputting the management print P, and FIGS. 6A to 6E are illustrative diagrams mainly illustrating screen transition of an operation screen displayed on the touch panel 18 of the information terminal 1 when the management print P is output.

First, in step S11, moving image data is uploaded (transmitted) from the information terminal 1 to the image server 2. A user confirms an operation screen illustrated in FIG. 6A, which is displayed on the display unit 15 of the information terminal 1, and operates the touch panel 18 to instruct transmission of the moving image data stored in a memory (not illustrated) of the information terminal 1. The terminal control unit 16 receives a transmission instruction for the moving image data from the user, controls the terminal data transmission and reception unit 13, and transmits the moving image data stored in the memory (not illustrated) from the terminal data transmission and reception unit 13 to the image server 2 via the communication line 3.

When the moving image data is transmitted to the image server 2, the server data transmission and reception unit 21 of the image server 2 receives the moving image data, stores the moving image data in the data storage unit 26, and outputs the moving image data to the still image generation unit 22.

In step S12, the still image generation unit 22 generates at least one piece of still image data based on the acquired moving image data and outputs the at least one piece of still image data to the still image selection unit 23. Here, as representative images of the moving image, for example, an image of a mountain, an image of a car, an image of a ship, an image of a parent and a child, and the like are generated as the still images, and output as a plurality of pieces of still image data.

The still image selection unit 23 acquires the plurality of pieces of still image data described above, generates a plurality of thumbnail image data corresponding to the plurality of still image data, and transmits the plurality of thumbnail image data to the information terminal 1 via the server data transmission and reception unit 21. The information terminal 1 receives the plurality of thumbnail image data in the terminal data transmission and reception unit 13, and selectably displays the plurality of thumbnail images on the touch panel 18 through the display control unit 14. FIG. 6B illustrates a list of thumbnail images selectably displayed on the touch panel 18. As the thumbnail images, five images of a mountain, two images of a car, one image of a ship, and one image of a parent and a child are displayed.

In step S13, the user operates the touch panel 18, and selects one of the thumbnail images displayed on the touch panel 18 in order to select one of a plurality of still images generated from the moving image. Information of the still image selected by the user is transmitted from the terminal data transmission and reception unit 13 to the image server 2 via the terminal control unit 16. The server data transmission and reception unit 21 of the image server 2 receives the information of the selected still image, and outputs the information of the selected still image to the still image selection unit 23. The still image selection unit 23 selects one still image from among the at least one still image based on the information of the selected still image, and outputs image data of the selected still image as selected still image data to the still image editing unit 24.

Here, the above-described image of a parent and a child is selected, and the still image data of the image of a parent and a child is output as the selected still image data.

The still image editing unit 24 transmits the selected still image data output from the still image selection unit 23 to the information terminal 1 via the server data transmission and reception unit 21. The information terminal 1 receives the selected still image data in the terminal data transmission and reception unit 13 and editably displays the selected still image based on the selected still image data on the touch panel 18 via the display control unit 14.

In step S14, the user operates the touch panel 18, and edits the selected still image displayed on the touch panel 18 in order to generate edited image data. The editing processing performed by the user includes, for example, processing such as selection of a background frame that becomes a background of the selected still image, as illustrated in FIG. 6C or image correction, trimming, enlargement and reduction, and rotation for the selected still image as illustrated in FIG. 6D. The information of the editing processing for the selected still image is transmitted from the terminal data transmission and reception unit 13 to the image server 2 via the terminal control unit 16. The server data transmission and reception unit 21 of the image server 2 receives the information of the editing processing and outputs the information of the editing processing to the still image editing unit 24. The still image editing unit 24 edits the selected still image based on the information of the editing processing and outputs image data of the selected still image subjected to the editing processing to the management marker registration unit 25 and the management image generation unit 28 as edited still image data.

The management marker registration unit 25 acquires the edited still image data, and registers the edited still image based on edited still image data as a management marker in step S15. Specifically, the management marker registration unit 25 calculates an image feature amount of the edited still image by performing image analysis on the edited still image based on a predetermined algorithm, sets the calculated image feature amount as the management marker, and associates the image feature amount with the corresponding moving image data stored in the data storage unit 26. By associating the management marker with the moving image data and storing the moving image data associated with the management marker in the data storage unit 26, the user can search for the moving image data based on the management marker.

Then, in step S16, the user operates the touch panel 18 of the information terminal 1 to give an output instruction for the management print P. Specifically, for example, the print size or the number of prints of the management print P is set by the user and the output instruction is performed, as illustrated in FIG. 6E.

When the output instruction is performed, the terminal data transmission and reception unit 13 transmits the output instruction for the management print P to the image server 2, and the server data transmission and reception unit 21 of the image server 2 receives the output instruction for the management print P from the information terminal 1 and outputs the output instruction to the server control unit 31.

The server control unit 31 outputs an issuing instruction for the access key for access to the moving image data corresponding to the management print P to the access key issuing unit 27. In step S17, the access key issuing unit 27 issues the access key for access to the moving image data based on the issuing instruction for the access key, and outputs the access key to the management image generation unit 28.

In step S18, the management image generation unit 28 acquires the access key from the access key issuing unit 27, acquires the edited still image data from the still image editing unit 24 or the data storage unit 26, generates a management image in which the edited still image and the access key are displayed, and outputs the management image data to the data storage unit 26 and the management image trimming unit 29. In the data storage unit 26, the management image data is stored in association with the moving image data or the like.

In step S19, based on the output instruction for the management print P acquired from the server control unit 31, the management image trimming unit 29 performs predetermined trimming processing on the management image based on the management image data, and outputs trimmed management image data.

As shown in Table 1, the relationship between the size and the aspect ratio of the print image is in a range from 1:1.34 to 1:1.50.

TABLE 1

| Size name | Aspect ratio |
| --- | --- |
| L | 1:1.43 |
| DSC | 1:1.34 |
| KG | 1:1.49 |
| 2L | 1:1.40 |
| Photo book frame A | 1:1.34 |
| Photo book frame B | 1:1.41 |
| Photo book frame C | 1:1.50 |

Figure 7A:
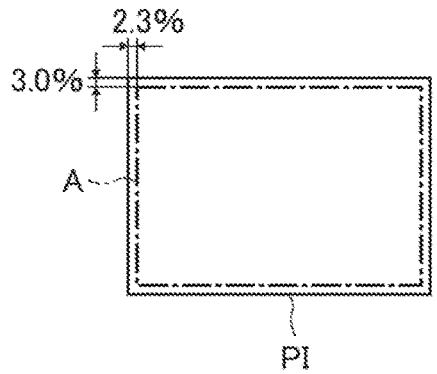
FIGS. 7A to 7C are illustrative diagrams illustrating automatic trimming when the management print P is generated.

In the management image PI generated by the management image generation unit 28, as illustrated in FIG. 7A, an arrangement area A of the edited still image and the access key is set with a vertical margin of 3.0% and a horizontal margin of 2.3%, so that the management image can be printed without the edited still image that is a management marker or the access key being cut even when the management image is printed in a medium of any size, and the aspect ratio of the management image PI is set to 1:1.49.

Figure 7B:
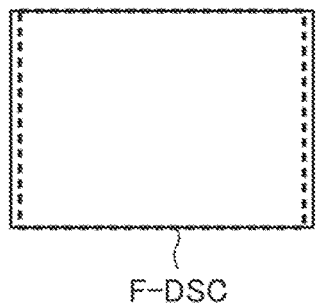
Figure 7C:
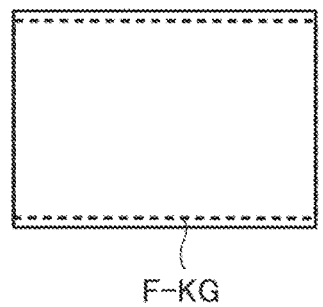

For example, when the management image PI is printed on a medium of DSC size, the management image trimming unit 29 trims the management image PI based on a frame F-DSC having an aspect ratio of DSC size, as illustrated in FIG. 7B, or, for example, when the print management image PI is printed on a medium of KG size, the management image trimming unit 29 trims the management image PI based on a frame F-KG having an aspect ratio of KG size, as illustrated in FIG. 7C. The management image trimmed by the management image trimming unit 29 is output to the server data transmission and reception unit 21 as the trimmed management image data.

The server data transmission and reception unit 21 acquires the trimmed management image data from the management image trimming unit 29, and based on the instruction of server control unit 31, transmits the output instruction for the management print and the trimmed management image data to the printer 4 connected via the communication line 3.

The printer 4 receives the trimmed management image data and the output instruction for the management print P from the image server 2, and prints the management image based on the trimmed management image data on a medium having a predetermined size according to the output instruction in step S20.

As understood from the above, the user can easily generate the management content based on the moving image and the still image in a short time, only by uploading the moving image data, selecting at least one still image which has been automatically generated based on the moving image data, and performing the instruction to output the still image (here, only performing an order of a commercial image material on which the still image is printed).

Figure 8:
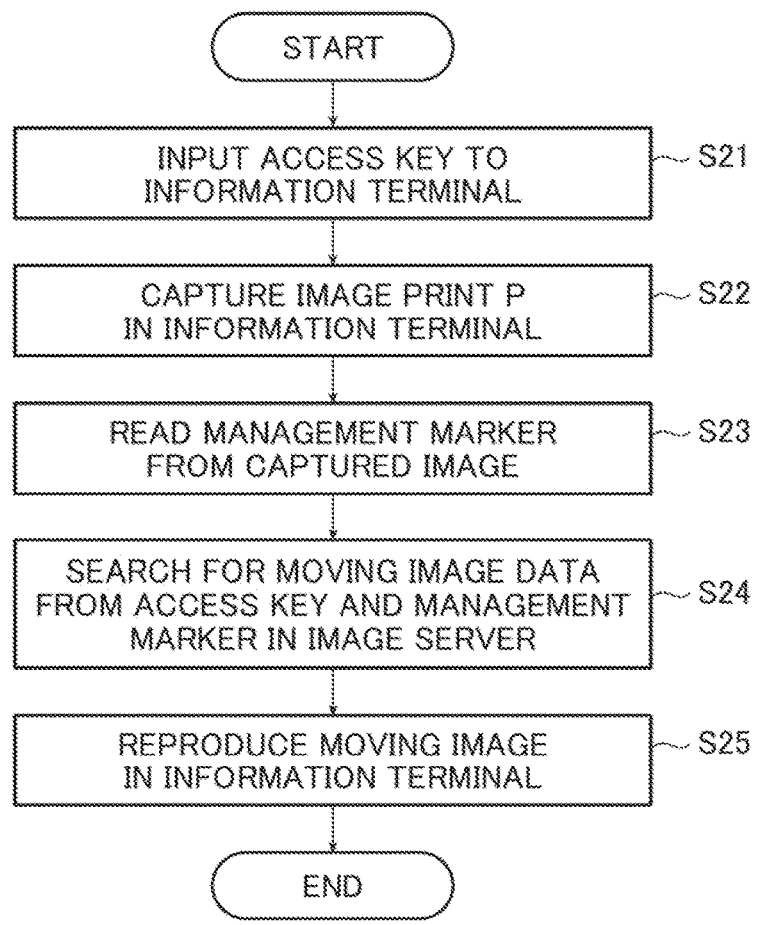
FIG. 8 is a flowchart when a corresponding moving image is reproduced based on the management print P.

Next, an operation for reproducing management content based on the management print P in the content management system of FIG. 1 will be described. FIG. 8 is a flowchart illustrating the reproduction flow of the management content.

In step S21, the user confirms the access key K printed on the management print P and inputs the access key K from the touch panel 13 of the information terminal 1.

Then, in step S22, the user operates the information terminal 1 to image (capture) the management print P using the imaging unit 11. The imaged (captured) management print P is displayed on the touch panel 18 of the information terminal 1.

After a still image portion of the management print P is captured, in step S23, the management marker reading unit 12 of the information terminal 1 performs image analysis on the captured image, which is based on the captured image data output from the imaging unit 11, based on a predetermined algorithm, and reads the management marker from the still image I in the captured image.

In subsequent step S24, the information terminal 1 transmits the above-described access key K and the above-described management marker to the image server 2, and the image server 2 receives the access key K and the management marker transmitted from the information terminal 1, and searches for a plurality of pieces of moving image data stored in the data storage unit 26 based on the access key K and the management marker in the image data search unit 30. Specifically, the image data search unit 30 limits a plurality of pieces of moving image data to be searched for using the access key K, and performs a search of the moving image data within the limited range using the management marker.

The searched moving image data is transmitted to the information terminal 1 via the server data transmission and reception unit 21, and the information terminal 1 receives the moving image data in the terminal data transmission and reception unit 13.

Finally, in step S25, the information terminal 1 reproduces the moving image based on moving image data in the display portion of the still image I of the management print P displayed on the touch panel 18.

As understood from the above, the user can perform reproduction of the moving image corresponding to the still image printed on the management print P, only by inputting the access key K printed in the management print P and imaging the management print P using the information terminal 1.

While the access key K illustrated in FIG. 4 is a number of ten digits, the access key K may be a two-dimensional code or a bar code, and the two-dimensional code or the bar code may be read from the captured image of the information terminal 1, thereby the input of access key K by the user may be omitted.

Further, while the content management system according to the above-described embodiment performs the editing processing on the selected still image based on the selected still image data, such as setting of a background frame, image correction such as color correction, trimming, enlargement and reduction, and rotation, the editing processing is not an essential, and the still image editing unit 24 may output the selected still image data to the management marker registration unit 25 and the management image generation unit 28 without performing any editing processing thereon, or the content management system of the present invention may not include the still image editing unit 24.

Further, in connection with the selection of the still image in the still image selection unit 23 or the editing processing of the still image in the still image editing unit 24, the information terminal 1 may perform reproduction of a moving image corresponding to the selection of the still image or the editing processing of the still image.

Figure 9:
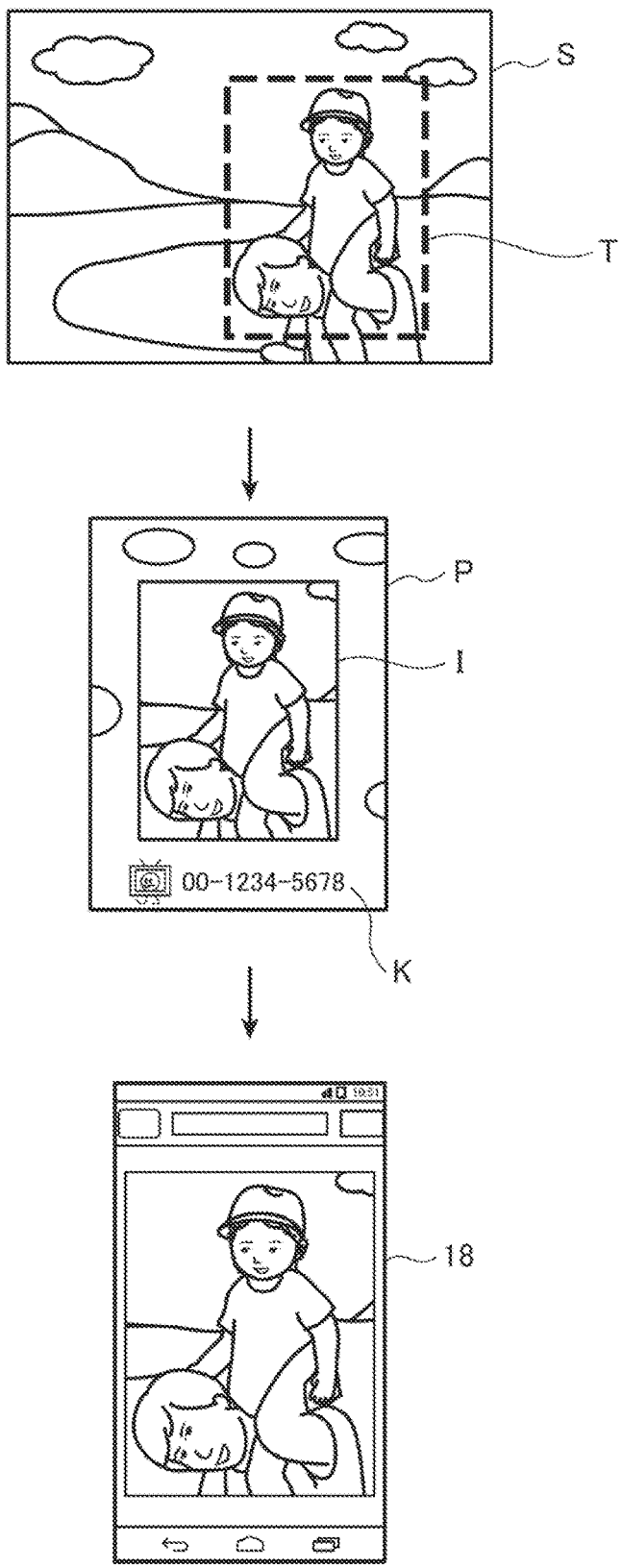
FIG. 9 is an illustrative diagram illustrating the relationship between the management print P having a still image trimmed by a user and a reproduced moving image.

Specifically, as illustrated in FIG. 9, when a portion surrounded by the dotted line T in the selected still image S is trimmed in order to create the management print P, the still image selection unit 23 may record a time code for the frame of the moving image corresponding to the selected still image, and the display control unit 14 may reproduce the moving image from the same frame as the selected still image based on the above-described time code when the corresponding moving image is reproduced by the information terminal 1.

In addition, the still image editing unit 24 may further record information of the dotted line T in which trimming is performed, and based on the time code and the trimming information recorded, the display control unit 14 may reproduce the moving image in the same frame as the selected still image and by enlarging the trimmed range surrounded by the dotted line T when the corresponding moving image is reproduced in the information terminal 1.

Further, the trimmed range may be subjected to image analysis, and the moving image may be reproduced so that the moving image follows the motion of a person, an animal, a vehicle or the like in the trimmed range. Specifically, the moving image may be reproduced while being trimmed so that the person or the like is located at the center of the display screen.

In the content management system according to the above-described embodiment, the respective roles of the information terminal 1 that is on the client side and the image server 2 that is on the server side have been described. However, for example, the management marker reading unit 12 may not be provided in the information terminal 1, the captured image data may be transmitted from the information terminal 1 to the image server 2, and the management marker registration unit 25 of the image server 2 may read the management marker from the captured image based on the captured image data as the management marker reading unit 12, or, for example, the still image editing unit 24 may not be provided in the image server 2, the selected still image data may be transmitted from the image server 2 to the information terminal 1, and the editing processing may be performed on the selected still image in the information terminal 1. The configurations of the respective units of the information terminal 1 and the image server 2 may be arranged in any one of the information terminal 1 and the image server 2.

While the above-described management marker is a still image itself or a feature amount of the still image that can be extracted from the still image using a predetermined algorithm, the management marker is not limited thereto and may be any information as long as the information can identify the storage location or the size of the moving image data associated with the still image.

In connection with the above-described management marker, while the management marker is stored in the storage unit in the above-described embodiment, the management marker itself may not be stored. Alternatively, information on generation and extraction of the management marker, for example, such as information indicating a frame of the moving image from which the still image selected by the user is extracted, information indicating a size of the still image extracted, information on how to generate the management marker, or information on how to identify the management marker, may be stored. This is because the management marker can be appropriately generated based on the information on the generation and the extraction of the management marker.

While the above-described access key comprises a predetermined character string, or a bar code or a two-dimensional code having information of a predetermined character string, the access key is not limited thereto. For example, input of the access key may be performed by implanting an IC tag into a commercial image material, inputting the information of the access key to the IC tag, and reading the IC tag by the information terminal. Alternatively, the input of the access key may be performed by implanting the information of the access key as an electronic watermark into the management image and reading the electronic watermark by the information terminal. Various known technologies can be used for implantation of the access key into the management image and acquisition of the access key from the management image, and a configuration not recognized by the user or a configuration not easily recognized by the user may be adopted.

Further, while the above-described access key is uniquely determined by the user who uploads the moving image data, the embodiment is not limited thereto. For example, the access key may be issued in units of management folders of moving image data or, for example, the access key may be issued in units of communities on an SNS related to the moving image data. In the content management system of the present invention, it is possible to selectively issue the access key depending on a management range of content or a management method of content.

Further, the moving image and the still image described above may not only be 2D content, but also may be 3D content.

The content management system according to the present invention is useful from the point of view that the moving image data is managed by the management image having the access key and the still image.

The user can rapidly access the corresponding moving image data from the management print having the management image without being conscious of, for example, the storage location of the moving image data at all. Further, if the management image and the time code of the movie image data are associated with each other as described above, the user can instantaneously access the scene corresponding to the management image in the management print without operating the moving image.

Next, a content management system that generates management image data including still image data of a plurality of still images automatically extracted from the moving image, captures a still image included in the print of the management image, and reproduces a scene of the moving image corresponding thereto will be described.

Since the configuration of the content management system of this embodiment is the same as that of the content management system illustrated in FIGS. 1 to 3 except for the image server 2, only the image server of this embodiment will be described hereinafter.

Figure 10:
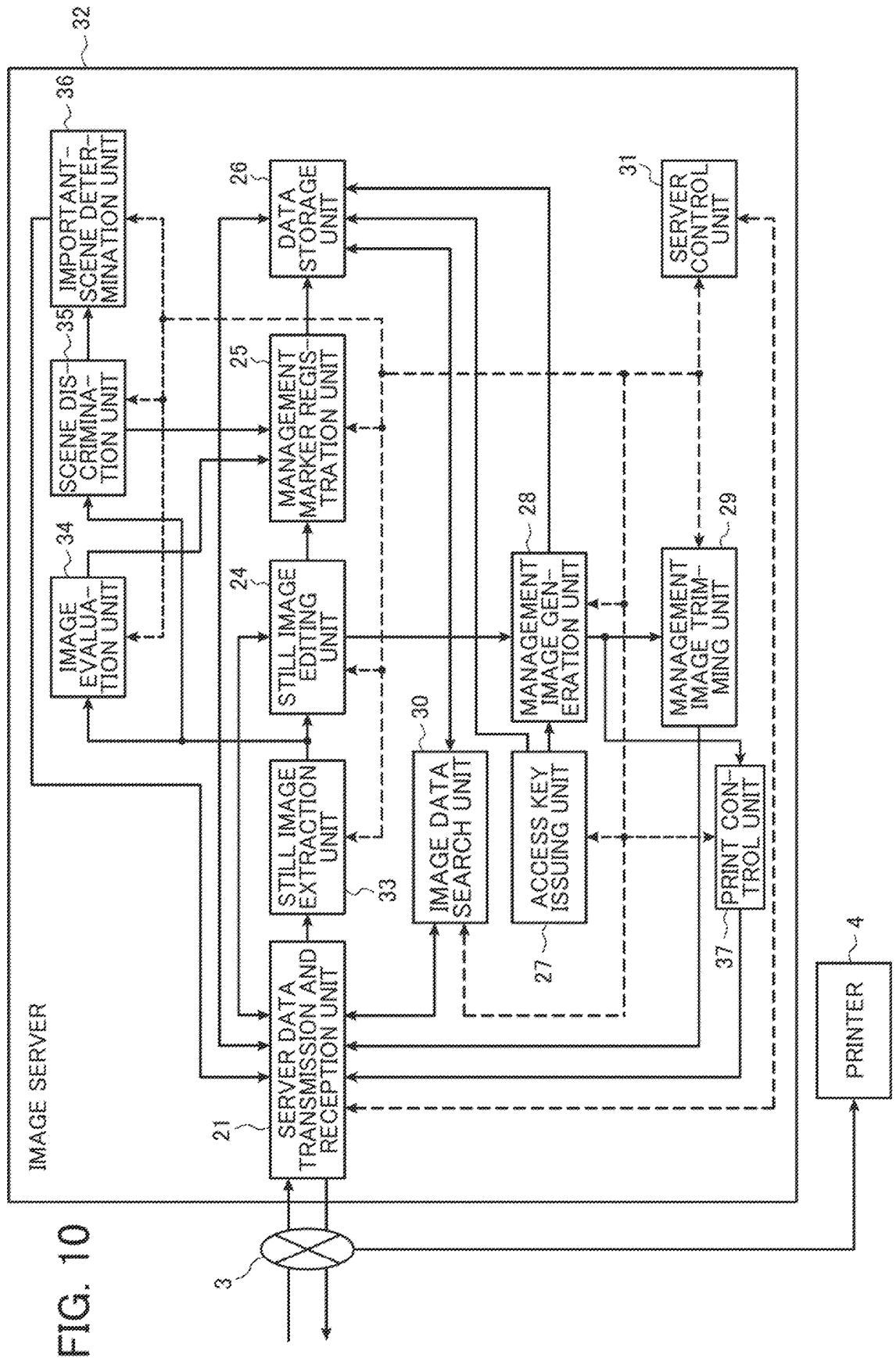
FIG. 10 is a block diagram illustrating a detailed configuration of an image server according to another embodiment of the present invention.

FIG. 10 is a block diagram illustrating a detailed configuration of an image server according to another embodiment of the present invention. The image server 32 of this embodiment illustrated in FIG. 10 includes a still image extraction unit 33 in place of the still image generation unit 22 and the still image selection unit 23 in the image server 2 illustrated in FIG. 3. Further, the image server 32 further includes an image evaluation unit 34, a scene discrimination unit 35, an important-scene determination unit 36, and a print control unit 37 in the image server 2 illustrated in FIG. 3.

The still image extraction unit 33 extracts still image data of a plurality of frames from the moving image data, and automatically extracts still image data of one still image or two or more still images corresponding to scenes of a best shot (scenes suitably representing an action of a person photographed in the moving image) from among the extracted still image data of the plurality of frames. Details of the still image extraction unit 33 will be described below.

Then, the image evaluation unit 34 evaluates a still image corresponding to one piece of still image data or each of a plurality of still images corresponding to two or more pieces of still image data automatically extracted by the still image extraction unit 33, and calculates an evaluation value.

For example, the image evaluation unit 34 can evaluate the still image based on at least one of a face of a person included in the still image, and defocusing, blurring, color, and brightness of the still image. For example, when the position of the face of a person is in a central portion of the output still image, the size of the face of a person is equal to or greater than a threshold value, the degree of defocusing or blurring is less than a threshold value, and color or brightness is in a certain range, an evaluation value is calculated to be high.

Then, for one piece of still image data or each of two or more pieces of still image data extracted by the still image extraction unit 33, the scene discrimination unit 35 discriminates the scene of the moving image including the still image corresponding to the still image data.

Figure 11:
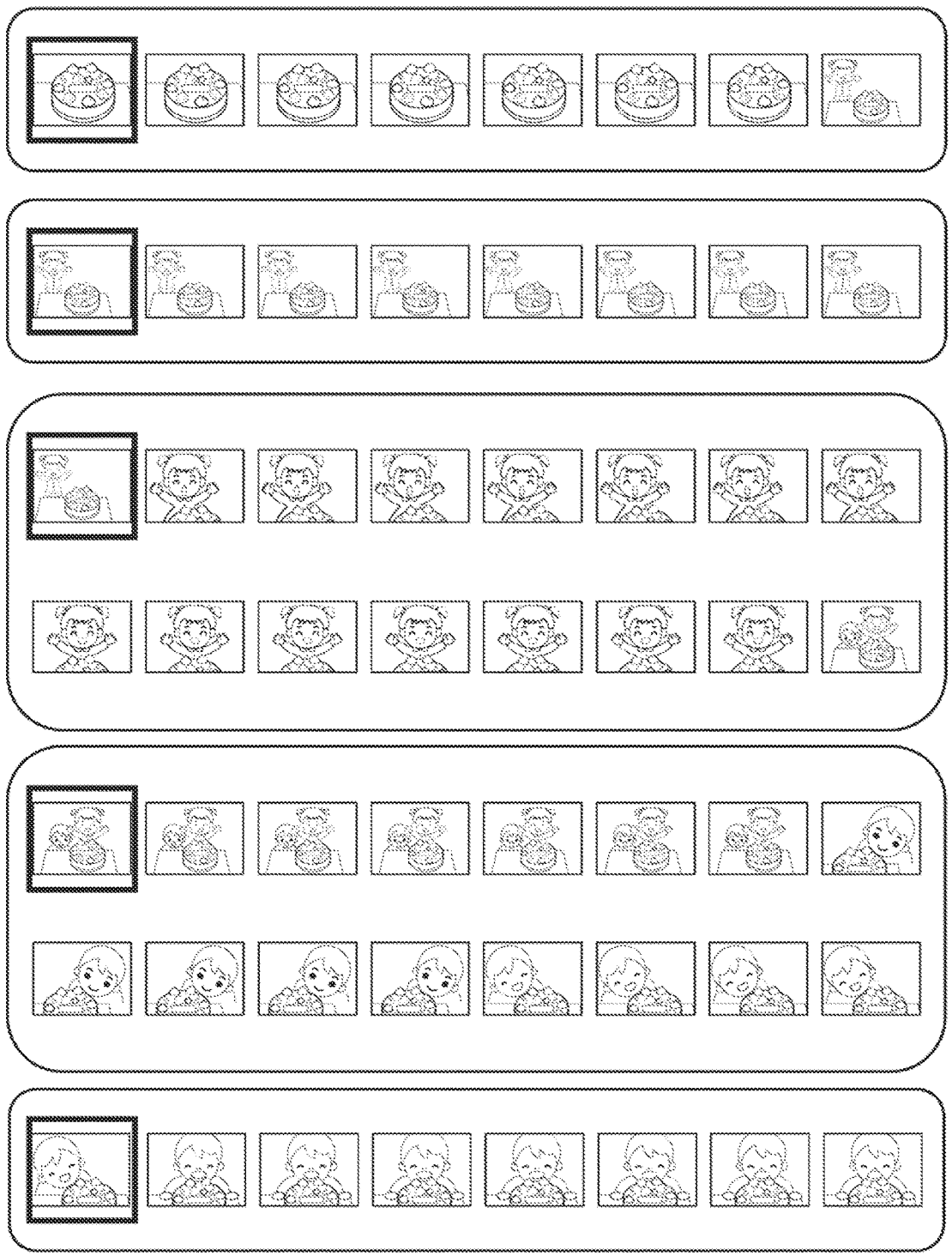
FIG. 11 is a conceptual diagram illustrating a state in which scenes of a moving image are divided.

For example, as illustrated in FIG. 11, when an amount of color change between two still images adjacent in an order of photographing date and time in the moving image exceeds a threshold value, the scene discrimination unit 35 determines that the scene of the moving image changes, and divides the scenes of the moving image between two adjacent still images between which an amount of color change exceeds the threshold value. Accordingly, the moving image can be divided into a plurality of scenes.

In the example illustrated in FIG. 11, a plurality of still images extracted from the moving image are arranged from left to right and from top to bottom in chronological order of photographing date and time (from oldest to newest), and the respective scenes of the divided moving image are surrounded by different frames.

Then, the scene of the moving image including the still image corresponding to one piece of still image data or each of two or more pieces of still image data extracted by the still image extraction unit 33 is discriminated from the plurality of scenes of the divided moving image.

Then, the important-scene determination unit 36 determines the degree of importance of the scene of the moving image discriminated by the scene discrimination unit 35.

For example, the important-scene determination unit 36 can calculate the degree of importance of the scene of the moving image based on the length (photographing time) of the scene of the moving image, the appearance frequency (degree of similarity of scenes) of the scene of the moving image, and the number of reproductions. For example, the degree of importance is determined to be high as the length of the scene of the moving image increases and the appearance frequency of the scene of the moving image increases. Further, the degree of importance is determined, to be high as the number of reproductions of the scene of the moving image increases.

Then, the print control unit 37 controls the size of the print on which the management image corresponding to the management image data is printed according to the number of pieces of still image data included in the management image data.

For example, the print control unit 37 can control the size of the print on which the management image is printed so that the size enlarges as the number of pieces of still image data included in the management image data increases.

Next, the still image extraction unit 33 will be described.

Figure 12:
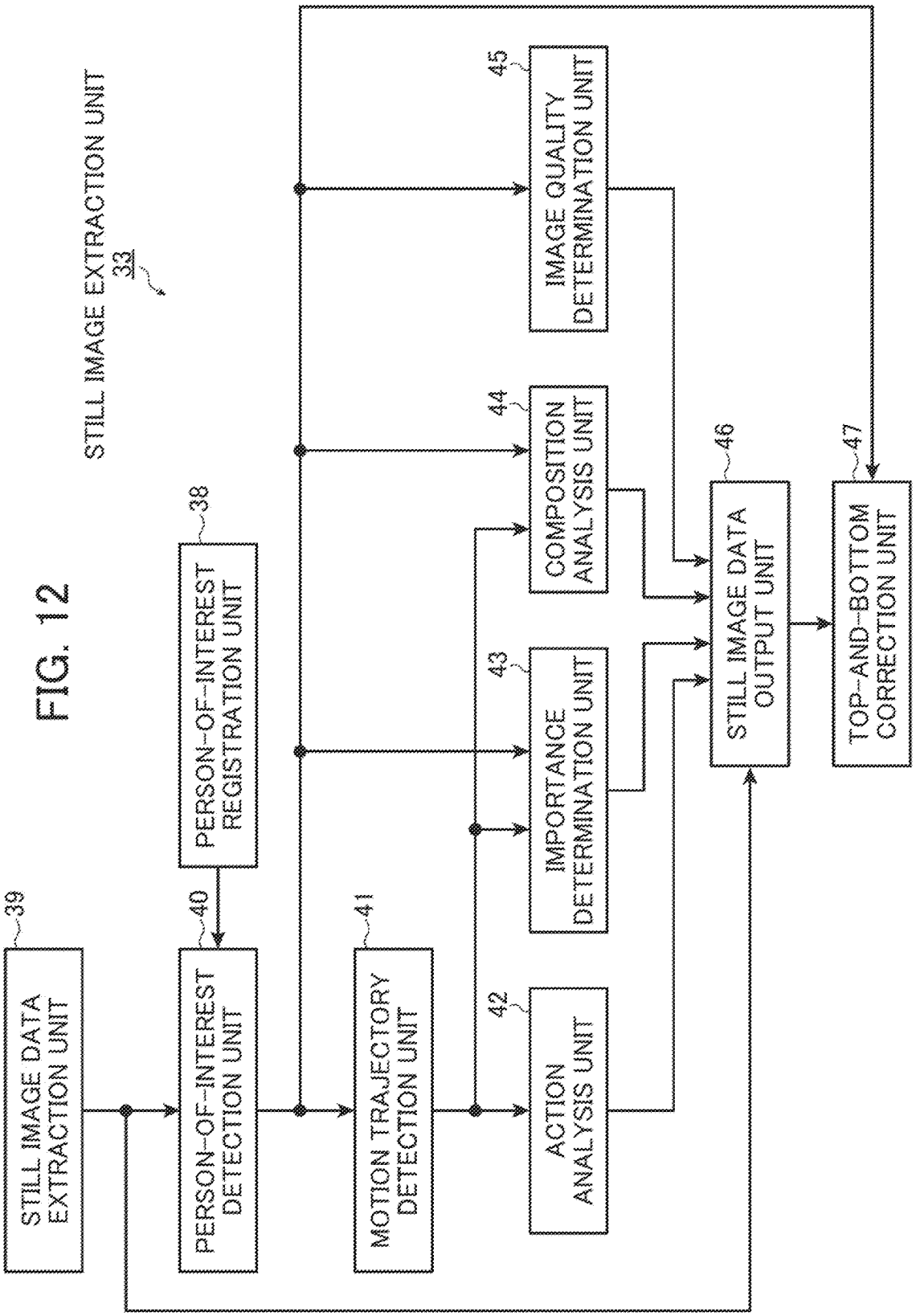
FIG. 12 is a block diagram illustrating a configuration of an image processing device according to an embodiment of the present invention.

FIG. 12 is a block diagram illustrating a configuration of the still image extraction unit according to an embodiment. The still image extraction unit 33 illustrated in FIG. 12 automatically detects a best-shot scene from the moving image and outputs still image data of a still image corresponding to the best-shot scene, and includes a person-of-interest registration unit 38, a still image data extraction unit 39, a person-of-interest detection unit 40, an motion trajectory detection unit 41, an action analysis unit 42, an importance determination unit 43, a composition analysis unit 44, an image quality determination unit 45, a still image data output unit 46, and a top-and-bottom correction unit 47.

The person-of-interest registration unit 38 registers, as a registered person, a person of interest to be subjected to processing among persons photographed in a moving image corresponding to moving image data.

For example, the person-of-interest registration unit 38 can register, as a registered person, a person specified by a user among the persons photographed in the moving image. Further, the person-of-interest registration unit 38 can register an image of the registered person (for example, a face image for identifying the person of interest).

Then, the still image data extraction unit 39 corresponds to the still image generation unit 22 illustrated in FIG. 3, and extracts still image data of a plurality of frames from the moving image data.

For example, the still image data extraction unit 39 can extract the still image data of all frames (respective frames) of the moving image data. However, the present invention is not limited thereto, and, for example, the still image data of one frame may be extracted from a certain number of frames, for example, every two frames. Further, only the still image data of the frames in an arbitrary period of the moving image corresponding to the moving image data may be extracted.

Then, the person-of-interest detection unit 40 detects the person of interest to be subjected to processing from each of the plurality of still images corresponding to the still image data of a plurality of frames extracted from the moving image data by the still image data extraction unit 39.

For example, the person-of-interest detection unit 40 can identify a person who matches or is similar to the registered person (a person of which the degree of similarity is equal to or greater than a threshold value), as the person of interest, from among persons in the still image by detecting the presence or absence of person in each of a plurality of still images and comparing the images of the detected persons with, for example, the image of the registered person registered in the person-of-interest registration unit 38 (comparison of face images or the like).

Alternatively, the person-of-interest detection unit 40 can identify a person who is determined to be a central person through central person determination, as a person of interest, from among persons in the still image by extracting the faces of the persons from each of the plurality of still images and performing the central person determination on the face images of the extracted persons.

In the central person determination, for example, same person determination processing is performed on a plurality of face images, and the plurality of face images are classified into image groups including face images of the same person. Then, at least one person among the persons classified into the image groups is determined as a main character, and at least one person highly related to the main character among persons other than the main character is determined as an important person.

A person corresponding to each image group can be identified based on the face images of the persons who are registered in the person-of-interest registration unit 38.

For example, a person of which the number of detections of the face image is largest can be determined to be the main character, or a person of which the number of still images in which the person has been photographed together with the main character is large among the persons other than the main character can be determined to be the important person.

Further, a distance between a face image of the main character and a face image of each of the persons other than the main character in the same still image may be calculated, and a person of which the distance between the face images is short may be determined to be the important person.

The important person may be determined based on one or both of the difference between information on photographing date and time of the still image in which the main character has been photographed and information on photographing date and time of the still image in which the person other than the main character has been photographed, and the difference between information on photographing position of the still image in which the main character has been photographed and information on photographing position of the still image in which the person other than the main character has been photographed.

The person-of-interest detection unit 40 can detect the position of the person of interest, the size of the person of interest, the region of the person of interest, the region of the upper body of the person of interest, the position of the face of the person of interest, the size of the face of the person of interest, the facial region of the person of interest, the direction of the face of the person of interest, and the like in the still image.

In the still image, the method of detecting a person of interest, the method of detecting a face of the person of interest, and the like are well known, and accordingly, the detailed description thereof will be omitted herein. A specific detection method is not particularly limited, and also the method of detecting a person of interest is not particularly limited.

Then, based on the detection result of the person of interest in the plurality of still images from the person-of-interest detection unit 40, the motion trajectory detection unit 41 detects the motion trajectory of the person of interest by tracking the motion of the person of interest in the moving image corresponding to the moving image data. The motion trajectory detection unit 41 can detect, for example, the length of the motion trajectory of the person of interest or the movement pattern of the person of interest by detecting the motion trajectory of the person of interest.

Here, for example, as illustrated on the left side of FIGS. 13A to 13C, a trajectory obtained by expressing a movement of a region of interest (ROI) such as the facial region of the person of interest in the form a line can be used as the motion trajectory of the person of interest. Further, as illustrated on the right side of FIGS. 13A to 13C, a motion history image (MHI) may be used as the motion trajectory of the person of interest. For example, the motion history image is obtained by expressing the history of the motion of the person of interest by changing a color at every certain time. The use of the motion history image enables, for example, the position of the person of interest, the size of the person of interest, the movement location of the person of interest, and the movement direction of the person of interest, in the motion history image to be recognized.

For example, based on the facial region of the person of interest, the motion trajectory detection unit 41 can track the motion of the person of interest in the moving image by comparing the facial region of the person of interest in the still image of the current frame with the detection region of an arbitrary position corresponding to the facial region of the person of interest in the still image of the next frame, and by detecting the position of the detection region in the still image of the next frame to which the facial region of the person of interest in the still image of the current frame moves, based on the position of the detection region in the still image of the next frame of which the degree of similarity to the facial region of the person of interest in the still image of the current frame is equal to or more than the threshold.

Here, it may become difficult to track the motion of the person of interest only by detecting the facial region of the person of interest since, for example, the position of the person of interest and the size of the person of interest in the still image change over time. In this case, it is possible to improve the success rate of tracking by dividing the region of the upper body of the person of interest into a certain number of regions, for example, four regions and tracking the motion of the person of interest for each of a total of five regions, in addition to the facial region of the person of interest.

Further, when the degree of similarity between the facial region of the person of interest in the still image of the current frame and the detection region in the still image of the next frame is calculated, since the detection region of a position corresponding to the facial region of the person of interest in the still image of the current frame is detected in the still image of the next frame, it is necessary to sequentially repeat calculation of the sum of the brightness values of all pixels included within the detection region of an arbitrary position for the detection regions of a plurality of positions. Therefore, a calculation amount for calculating the sum of the brightness values for each frame becomes large.

In this case, the calculation amount can be reduced by generating an integral image of the still image of the next frame (that is, each frame) and calculating the sum of the brightness values using the generated integral image, and thus, the processing can be sped up. For example, the integral image is an image in which the pixel of each coordinate has an integral value of the brightness values from an upper left pixel to the pixel of each coordinate when the coordinate of the pixel of the still image is assumed to increase from the left to the right and from top to bottom in the still image.

Since a method of calculating the sum of the brightness values of all pixels included in a region corresponding to the facial region of the person of interest using the integral image is known, the detailed description thereof will be omitted herein. Further, when the motion of the person of interest is tracked, the method for reduction of the calculation amount and for speeding up the processing is not limited to the use of the integral image, and various methods such as, for example, a mean shift method may be used therefor. Since the mean shift method is known, the detailed description thereof will be omitted.

Then, the action analysis unit 42 analyzes the action of the person of interest in the moving image based on the motion trajectory of the person of interest such as a motion trajectory of a region of interest, for example, a facial region or the like detected by the motion trajectory detection unit 41, and calculates an evaluation value for the action of the person of interest with respect to each of the plurality of still images based on the action of the person of interest analyzed.

For example, the action analysis unit 42 defines in advance the motion trajectory with respect to the action of the person of interest such as, for example, the motion trajectory when the person of interest runs, and analyzes the action of the person of interest by detecting a portion similar to the motion trajectory defined in advance from the motion trajectory of the person of interest detected by the motion trajectory detection unit 41. Then, the action analysis unit 42 can calculate evaluation values for the action of the person of interest depending on the types of the action of the person of interest such that, for example, when the action of the person of interest is a running motion, a specified value is given to the running motion.

Further, the action analysis unit 42 can analyze the action of the person of interest and calculate the evaluation value for the action of the person of interest based on the motion history image as illustrated on the right side of FIGS. 13A to 13C, as the motion trajectory of the person of interest.

The action analysis unit 42 can recognize that the person of interest is running from the right side to the left side in the drawing as illustrated on the right side of FIG. 13A, the person of interest is moving only a right hand in a state of rest as illustrated on the right side of the FIG. 13B, the person of interest is picking up something on the ground as illustrated on the right side of the FIG. 13C, or the like by analyzing the action of the person of interest based on a motion history image. In addition, the action analysis unit 42 can calculate the evaluation value for the action of the person of interest, based on, for example, whether the person of interest moves, the movement position and the movement direction of the person of interest, or the like.

Then, the importance determination unit 43 determines the degree of importance of each of the plurality of still images based on at least one of the length of the motion trajectory of the person of interest, the position of the person of interest in the still image, and the size of the person of interest in the still image, and calculates an evaluation value of the degree of importance for each of the plurality of still images based on the degree of importance determined.

For example, when the motion trajectory of the person of interest is long (when the length is equal to or more than a threshold value), a degree at interest of a photographer in the person of interest is estimated to be high. Therefore, the importance determination unit 43 determines the degree of importance of the still image corresponding to the scene having a long motion trajectory for the person of interest among the moving images to be high. Further, the degree of importance of the still image in which the person of interest is photographed in the central portion or the degree of importance of the still image in which the person of interest is photographed to be large (the size of the person of interest is equal to or more than a threshold value) is determined to be high. Then, the importance determination unit 43 calculates the evaluation value of the degree of importance such that the greater the degree of importance becomes, the higher the evaluation value becomes.

Then, the composition analysis unit 44 analyzes quality of the composition of each of the plurality of still images based on at least one of the position of the person of interest in the still image, the size of the person of interest in the still image, and the movement pattern of the person of interest, and calculates an evaluation value for each of the plurality of still images based on the quality of the composition analyzed.

The composition analysis unit 44 analyzes, for example, the composition of the still image in which the person of interest is photographed in a central portion or the composition of the still image in which the person of interest is photographed to be large (a size of the person of interest is equal to or more than a threshold value) to be better than the composition of the still image in which the person of interest is not photographed in a central portion or the composition of the still image in which the person of interest is not photographed to be large. Then, the composition analysis unit 44 can calculate the evaluation value such that the evaluation value of the composition of the still image analyzed to be good is greater than the evaluation value of the composition of the still image analyzed not to be good.

Further, the composition analysis unit 44 defines a movement pattern of the person of interest such as, for example, a movement pattern in which the person of interest moves from a left end to a right end of the moving image in advance, and detects a portion in which the person of interest moves in the movement pattern defined in advance, from among motion trajectories of the person of interest detected by the motion trajectory detection unit 41. Then, the composition analysis unit 44 analyzes the composition of the still image corresponding to the portion in which the person of interest moves in the movement pattern defined in advance to be good, and can calculate the evaluation value such that the evaluation value of the composition of the still image analyzed to be good is greater than the evaluation value of the composition of the still image analyzed not to be good.

Then, the image quality determination unit 45 determines image quality of each of the plurality of still images based on the region of the person of interest in the still image, for example, the region of interest such as the facial region, and calculates an evaluation value of the image quality for each of the plurality of still images based on the image quality determined.

Image quality of the still image extracted from the moving image may be high or may be low depending on the method of compressing the moving image data. Further, defocusing or blurring may be generated in the still image due to defocus, camera shake or the like, or brightness, color tone, contrast or the like may not be appropriate. However, even when the image quality of a background or the like is bad, the image quality determination unit 45 determines the image quality of the still image to be good if image quality of a region of interest such as a facial region or a body region of the person of interest is good. Then, for the still image of which the image quality is determined to be good, the image quality determination unit 45 can calculate the evaluation value of the image quality such that the better the image quality is, the higher the evaluation value becomes.

Then, the still image data output unit 46 outputs still image data of the still image in which the evaluation value for the action of the person of interest or a comprehensive evaluation value of the evaluation value for the action of the person of interest and at least one of the evaluation value of the degree of importance, the evaluation value of the composition, and the evaluation value of image quality is equal to or greater than a threshold value, as still image data of the still image corresponding to the best-shot scene, from among the still image data of a plurality of frames extracted from the moving image data by the still image data extraction unit 39.

Finally, the top-and-bottom correction unit 47 corrects the top and bottom of the still image corresponding to the still image data output from the still image data output unit 46 so that the top and bottom of the still image corresponding to the still image data output from the still image data output unit 46 matches the top and bottom of the photographing device when the moving image is captured, based on the direction of the face of the person of interest detected by the person-of-interest detection unit 40.

Figure 14A:
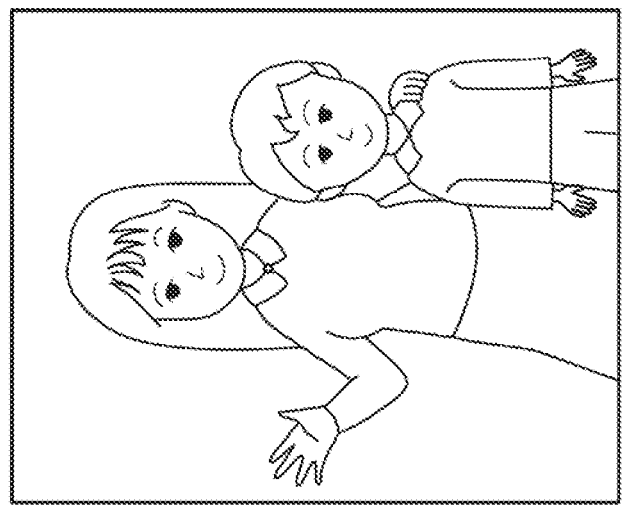
FIG. 14A is a conceptual diagram of an example in which a still image is rotated 90° to the left.
Figure 14B:
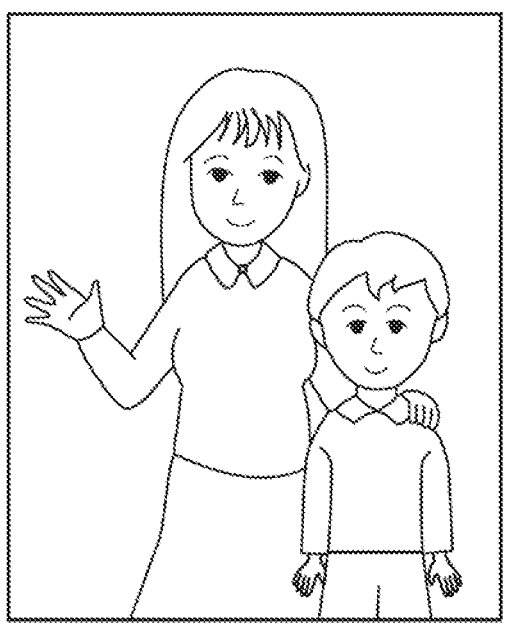
FIG. 14B is a conceptual diagram of an example in which the still image illustrated in FIG. 14A is rotated 90° to the right to correct the top and bottom thereof.

FIG. 14A is a conceptual diagram of an example illustrating a still image rotated 90° to the left. When the moving image is captured, such a still image is obtained by performing photographing in a state in which a photographing device is rotated 90° to the right. The top-and-bottom correction unit 47 can correct the top and bottom of the still image as illustrated FIG. 14B by rotating the still image illustrated in FIG. 14A 90° to the right so that the top and bottom of the still image becomes the same as the top and bottom of the photographing device when the moving image is captured.

When two or more persons are registered in the person-of-interest registration unit 38, the person-of-interest detection unit 40 can detect each of the two or more persons of interest from a plurality of still images and sequentially identify who the detected person of interest is. In this case, the motion trajectory detection unit 41, the action analysis unit 42, the importance determination unit 43, the composition analysis unit 44, the image quality determination unit 45, the still image data output unit 46, and the top-and-bottom correction unit 47 sequentially perform processing on each of the two or more persons of interest.

Next, an operation of the still image extraction unit 33 illustrated in FIG. 12 will be described with reference to the flowchart illustrated in FIG. 15.

Figure 15:
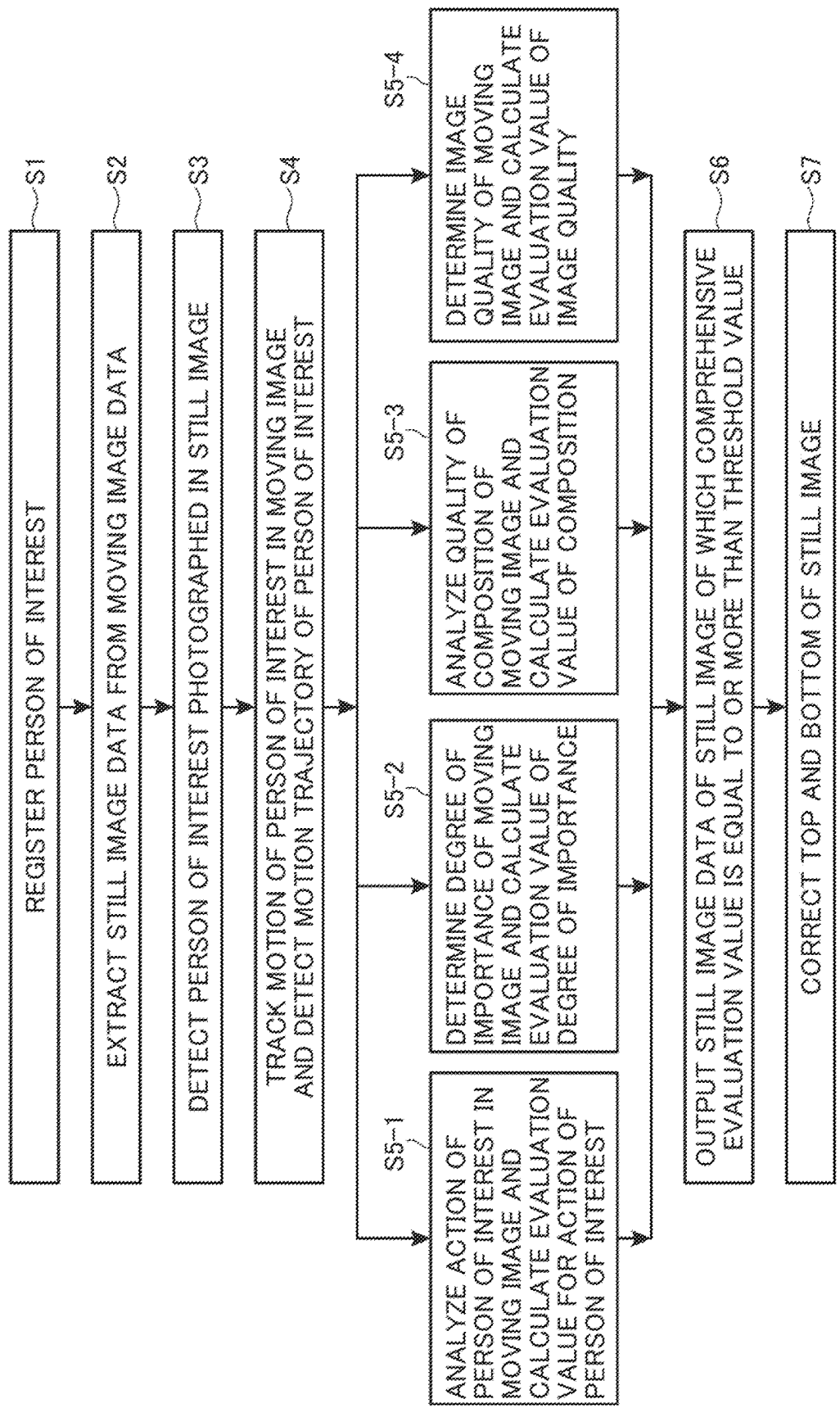
FIG. 15 is a flowchart illustrating an example of an operation of the image processing device illustrated in FIG. 12.

First, among persons photographed in the moving image, a person specified, for example, by a user is registered as a person of interest by the person-of-interest registration unit 38, as illustrated in the flowchart of FIG. 15 (step S1).

Figure 16:
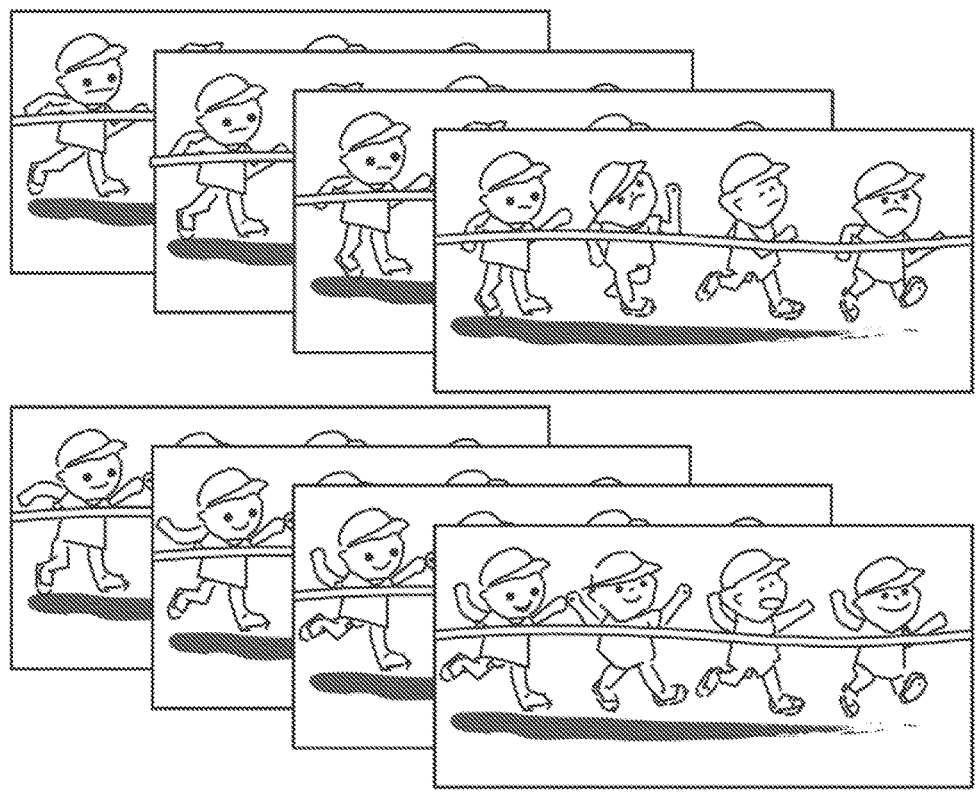
FIG. 16 is a conceptual diagram illustrating an example of a state in which still images of all frames are extracted from a moving image.

Then, for example, the still image data of all frames is extracted from the moving image data by the still image data extraction unit 39 (step S2). That is, the still image of all the frames is extracted from the moving image, as illustrated in FIG. 16.

The registration of the person of interest may be performed after the still image data is extracted from the moving image data.

Then, the person-of-interest detection unit 40 detects the person of interest registered in the person-of-interest registration unit 38 from among the respective still images of all frames extracted by the still image data extraction unit 39 (step S3). Accordingly, in each of the still images of all frames, the person of interest is identified, and the position of the person of interest, the size of the person of interest, the region of the person of interest, and the like in each of the still images of all frames are detected, as shown by a surrounding frame in FIG. 17.

Figure 17:
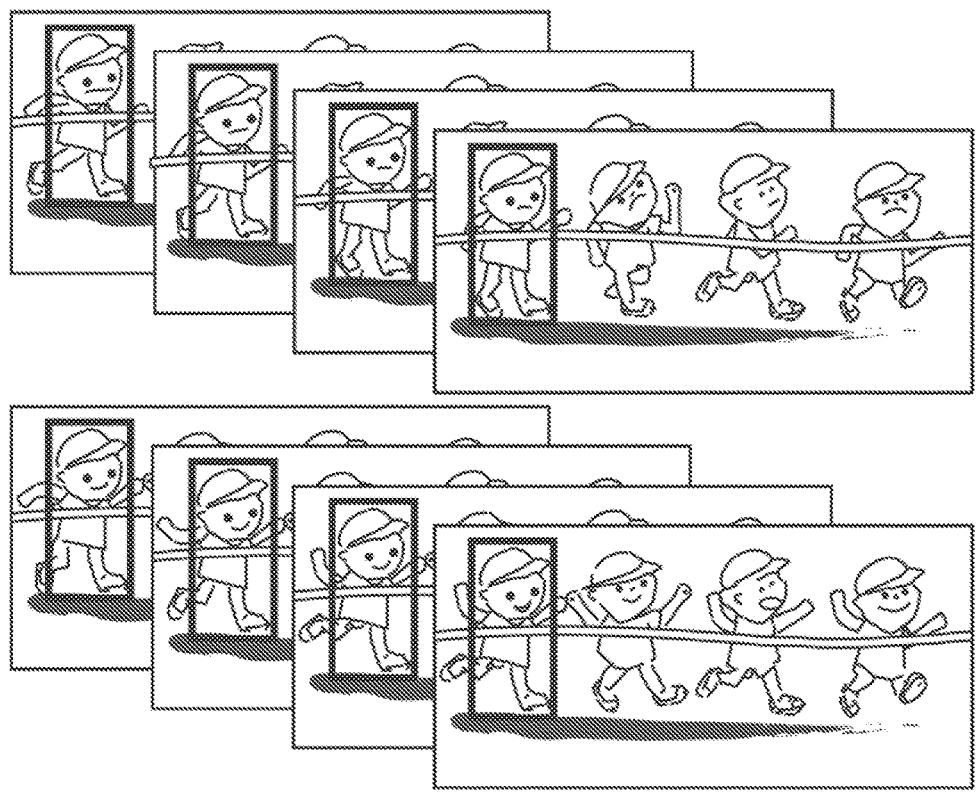
FIG. 17 is a conceptual diagram illustrating an example of a state in which a portion of a person detected from each of the still images of all the frames illustrated in FIG. 16 is surrounded by a frame.

Then, based on the detection result of the person of interest in the still images of all frames, the motion trajectory detection unit 41 tracks the motion of the person of interest in the moving image, such as the motion of the region of interest surrounded by a frame in FIG. 17, and detects the motion trajectory of the person of interest (step S4). Accordingly, it is possible to obtain, as an motion trajectory of the person of interest, for example, a trajectory in which the movement of the region of interest such as the facial region is expressed in the form a line, as illustrated on the left side of FIGS. 13A to 13C, or a motion history image as illustrated on the right side of FIGS. 13A to 13C.

Then, based on the motion trajectory of the person of interest detected by the motion trajectory detection unit 41, the action analysis unit 42 analyzes the motion of the person of interest in the moving image, and then, calculates the evaluation value for the motion of the person of interest with respect to each of the still images of all frames based on the action of the person of interest analyzed (step S5-1).

Further, the importance determination unit 43 determines the degree of importance of each of all of the still images based on the length of the motion trajectory of the person of interest, the position of the person of interest in the still image, and the size of the person of interest, and then, calculates the evaluation value of the degree of importance for each of the still images of all of the frames based on the degree of importance determined (step S5-2).

Further, the composition analysis unit 44 analyzes the quality of the composition of each of all the still images based on the position of the person of interest in the still image, the size of the person of interest, and the movement pattern of the person of interest, and then, calculates the evaluation value of the composition for each of the still images of all the frames based on the quality of the composition analyzed (step S5-3).

In addition, the image quality determination unit 45 determines the image quality of each of the still images of all frames based on the region of the person of interest in the still image, and then, calculates the evaluation value of the image quality for each of all still images depending on the image quality determined. In this embodiment, the evaluation value is calculated depending on the degree of defocusing and blurring (step S5-4).

For example, a determination of the defocusing and blurring of the region of interest surrounded by a frame in FIG. 14 is performed and the evaluation value of the image quality is calculated to be low as the degree of the defocusing and blurring is high.

The order of calculation of the evaluation value for the action of the person of interest, the evaluation value of the degree of importance, the evaluation value of the composition, and the evaluation value of the image quality is not particularly limited, and the evaluation values can be calculated in an arbitrary order. These evaluation values can be calculated in parallel, that is, simultaneously.

Figure 18:
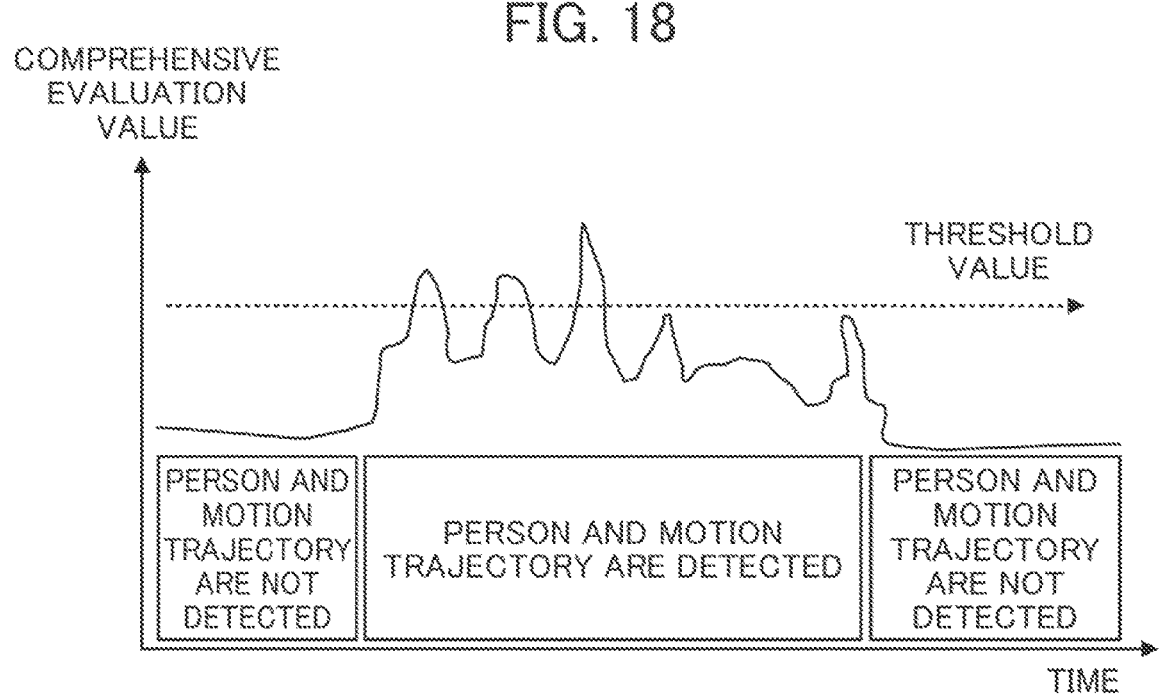
FIG. 18 is a graph illustrating an example of a comprehensive evaluation value of the respective still images of all the frames extracted from the moving image.

Then, the still image data output unit 46 outputs the still image data of the one or more still images of which the comprehensive evaluation value of the evaluation value for the action of the person of interest, the evaluation value of the degree of importance, the evaluation value of the composition, and the evaluation value of the image quality (a value obtained by summing the respective evaluation values) is equal to or greater than a threshold, as illustrated in FIG. 18, as still image data of the still image corresponding to the best-shot scene, among the still image data of all frames extracted from the moving image data by the still image data extraction unit 39 (step S6).

Figure 19:
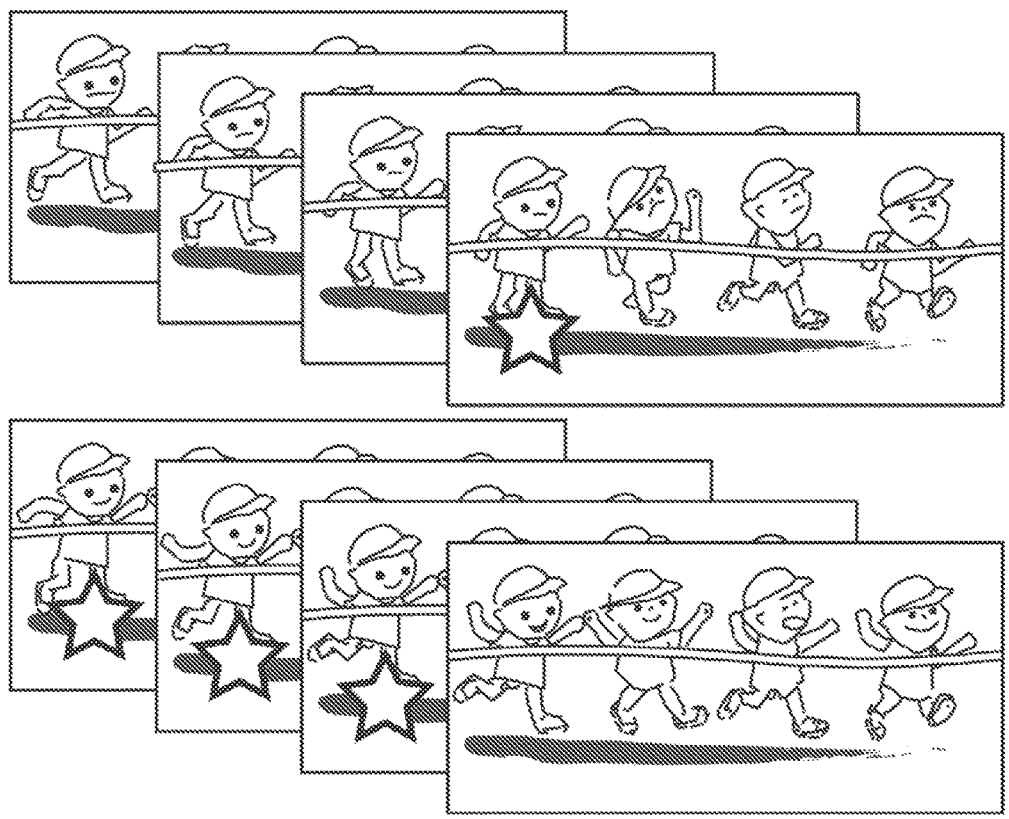
FIG. 19 is a conceptual diagram illustrating an example of a state in which an asterisk is given to a still image of which the comprehensive evaluation value is equal to or more than a threshold from among the still images of all the frames illustrated in FIG. 16.

Here, FIG. 18 is a graph illustrating an example of a comprehensive evaluation value of the respective still images of all frames extracted from the moving image. In FIG. 18, the vertical axis indicates the comprehensive evaluation value of the respective still images, and the horizontal axis indicates time (frame). As illustrated in FIG. 18, still image data of the still image of which the comprehensive evaluation value is equal to or more than a threshold value, as illustrated by an asterisk in FIG. 19, is output, from among still images, from which the person of interest is detected by the person-of-interest detection unit 40 and the motion trajectory of the person of interest is detected by the motion trajectory detection unit 41, among all still images.

Then, finally, the top-and-bottom correction unit 47 corrects the top and bottom of the still image so that the top and bottom of the still image matches the top and bottom of a photographing device when the moving image is captured based on a direction of the face of the person of interest detected by the person-of-interest detection unit 40 (step S7).

As described above, the still image extraction unit 33 can automatically detect the best-shot scene from the moving image based on, for example, a comprehensive evaluation value including an evaluation value for the action of the person of interest in the moving image, an evaluation value of the degree of importance of the still image, an evaluation value of the composition, and the evaluation value of image quality, and extract still image data of the still image corresponding to the best-shot scene from among the still image data of all frames extracted from the moving image data.

Next, an operation when management image data is generated in the content management system of this embodiment will be described.

As described above, one piece or two or more pieces of still image data are output as output still image data from the still image data of a plurality of frames extracted from the moving image data by the still image extraction unit 33.

Then, for one output still image data or each of the two or more pieces of output still image data extracted by the still image extraction unit 33, the scene discrimination unit 35 discriminates the scene of the moving image including the output still image corresponding to the output still image data.

Then, the management marker registration unit 25 registers an image feature amount of one output still image data or each of the two or more pieces of output still image data, or an image feature amount of one output still image corresponding to the one output still image data or each of the two or more output still images corresponding to the two or more pieces of output still image data, as a management marker, in association with the moving image data of the scene of the moving image corresponding to one output still image or each of the two or more output still images.

Then, the management image generation unit 28 generates the management image data including at least one output still image data.

Next, an operation when a print of the management image is captured and the scene of the moving image is reproduced in the content management system of this embodiment will be described.

The print of the management image corresponding to the management image data is captured and the captured image data is generated by the imaging unit 11.

Then, the management marker is read from the captured image corresponding to the captured image data by the management marker reading unit 12.

Figure 20:
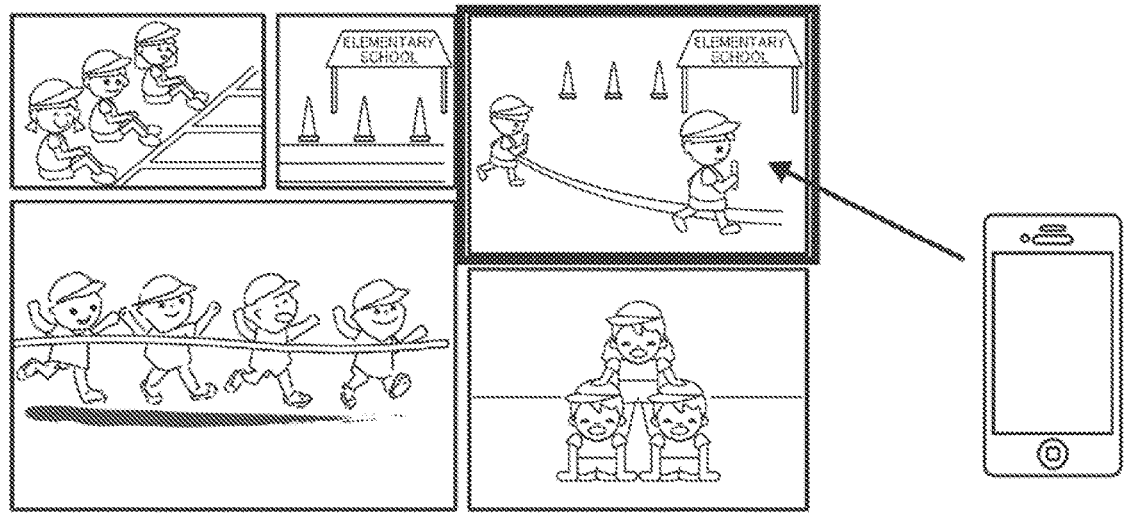
FIG. 20 is a conceptual diagram illustrating a state in which one output still image is captured from among output still images included in a print of a management image.

Here, for example, when one output still image of the top right side is captured from among the five output still images included in the print of the management image by the imaging unit 11, as illustrated in FIG. 20, the display control unit 14 performs control so that the scene of the moving image corresponding to the moving image data associated with the management marker read from the captured one output still image by the management marker reading unit 12 is reproduced on the display unit 15. Accordingly, the scene of the moving image associated with the captured one output still image is reproduced on the display unit 15.

The same applies to an operation when another output still image is captured from among five output still images included in the print of the management image by the imaging unit 11.

When the reproduction of the scene of the moving image corresponding to the captured one output still image ends, for example, the reproduction of the moving image ends. In other words, the scene of the moving image corresponding to the output still image of the photographing date and time next to the captured one output still image is not continuously reproduced.

Thus, in the content management system of this embodiment, the respective output still images included in the print of the management image are associated with the respective corresponding scenes of the moving image. Therefore, the output still images included in the print of the management image can be used as indexes of the respective corresponding scenes of the moving image, and a desired scene of the moving image can be reproduced by capturing a desired output still image included in the print of the management image.

Here, it is preferable to control the size of the print of the management image according to the number of scenes included in the moving image.

For example, in the case of a moving image corresponding to about one minute, since the moving image only includes one to several scenes, it is enough to print a management image including several output still images. Therefore, a print having a large size is unnecessary, and, for example, a print of an L size may be used.

In contrast, when the reproduction time of a moving image is long, the moving image may include ten or more scenes. In this case, if the output still images corresponding to all scenes are included in the print of the management image having an L size, the size of the output still image included in the print of the management image becomes small, and it is difficult for the user to capture the output still image to be subjected to processing by using the information terminal 1. Therefore, for example, it is preferable to recommend the print of the management image having a larger size than the L size.

Accordingly, the print control unit 37 can control the size of the print on which the management image is printed so that the size is enlarged as the number of pieces of output still image data included in the management image data increases. In other words, the print control unit 37 enlarges the size of the print on which the management image is printed so that the size of the output still image included in the print of the management image is equal to or more than a threshold value according to the number of pieces of output still image data included in the management image data.

However, when the user wants a print of the management image having a certain size such as an L size, it is preferable to reduce the number of pieces of output still image data included in the management image data so that the size of the output still image included in the print of the management image is equal to or more than a threshold value, similarly to the above.

Thus, when the management image is assumed to be printed on the print having a certain size, if the size of the output still image included in the print of the management image is less than the threshold value, the management image generation unit 28 can select a number of pieces of output still image data from among the output still image data, so that the size of the output still image included in the print of the management image having a certain size is equal to or more than the threshold value, and generate the management image data including the selected number of pieces of output still image data.

Figure 21:
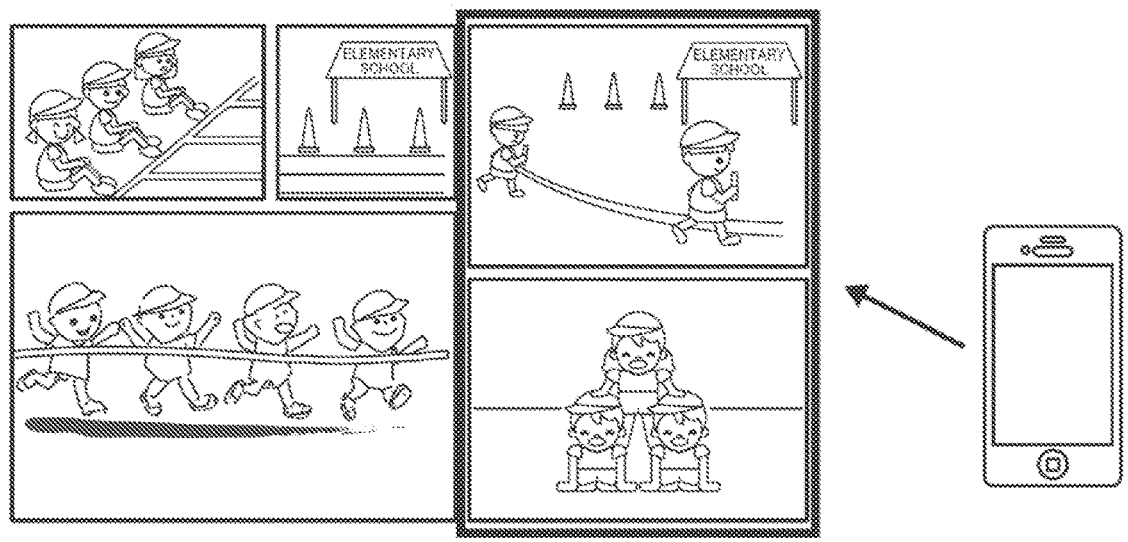
FIG. 21 is a conceptual diagram illustrating a state in which two output still images are simultaneously captured from among output still images included in the print of the management image.

Further, for example, when two output still images on the right side are simultaneously captured from among the five output still images included in the print of the management image by the imaging unit 11 as illustrated in FIG. 21, the display control unit 14 can perform control so that the respective scenes of the moving image corresponding to the simultaneously captured two output still images are simultaneously reproduced on the display unit 15.

In addition, the same applies to an operation when three or more output still images are simultaneously captured from among the five output still images included in the print of the management image by the imaging unit 11.

However, when scenes of a plurality of moving images are reproduced simultaneously, the reproduction time for each moving image is different, and thus, the end time of each moving image is also different.

When by using an AR technology, the print of the captured management image is displayed on the display unit 15, and the scene of the moving image is AR-reproduced in the display portion of the output still image of the print of the management image displayed on the display unit 15, association with the display portion of the output still image of the print of the management image is important, and thus, it is not preferable to change a layout at the time of reproduction. Therefore, in the case of the AR reproduction, it is preferable for the display control unit 14 to perform control so that nothing is displayed in the display portion of the output still image in which the reproduction of the scene of the moving image ends.

In contrast, when the scene of the moving image is normally-reproduced on the full screen or within a window having an arbitrary size of the display unit 15 without using the AR technology, it is preferable to lay out the display portion of the output still image of the print of the management image again. Therefore, in the case of normal reproduction, it is preferable for the display control unit 14 to perform control so that the display portion of the output still image in which the reproduction of the scene of the moving image ends is caused to be in a non-display state, and the display portion of the output still image in which the reproduction of the scene of the moving image does not end is enlarged up to the display portion of the output still image that is in a non-display state to reproduce the scene of the moving image.

Further, in either the AR reproduction or the normal reproduction, for example, the display control unit 14 can perform control so that an advertisement related to the scene of the moving image of which the reproduction ends is displayed in the display portion of the output still image in which the reproduction of the scene of the moving image ends, based on the moving image content of the scene of the moving image. For example, when reproduction of a scene of a moving image in which a child is photographed ends, an advertisement for a toy related to the child is displayed in the display portion of the output still image.

Thus, by displaying an advertisement in the display portion of the output still image of which the reproduction of the scene of the moving image ends, the advertisement is displayed while the scene of the moving image of which the reproduction does not end is reproduced. The user necessarily sees the simultaneously displayed advertisement while the scene of the moving image of which the reproduction does not end is reproduced, and thus, a high browsing rate of the advertisement can be obtained in comparison with a case in which only the advertisement is displayed.

The image data of the advertisement (a moving image or a still image) can be stored in the data storage unit 26.

Alternatively, when the scenes of the moving image respectively corresponding to two output still images which are simultaneously captured are simultaneously reproduced on the display unit 15, the display control unit 14 can perform control so that an advertisement or a scene of an arbitrary moving image of which the degree of importance is determined to be equal to or more than a threshold value by the important-scene determination unit 36 is reproduced in the display portion of the output still image in which the scene of the moving image of which the degree of importance is determined to be less than the threshold value by the important-scene determination unit 36 is reproduced.

Next, an operation when the management image data is generated using a plurality of pieces of moving image data will be described.

In this case, the still image data extraction unit 39, the person-of-interest detection unit 40, the motion trajectory detection unit 41, the action analysis unit 42, the still image data output unit 46, and the scene discrimination unit 35 repeatedly perform the same processing as the processing to which one moving image data is subjected, as described above, for each of a plurality of pieces of moving image data.

That is, for each of the plurality of pieces of moving image data, one piece or two or more pieces of still image data among the still image data of a plurality of frames extracted from the moving image data are output as output still image data from the still image extraction unit 33.

Further, the scene discrimination unit 35 discriminates the scene of the moving image including the output still image corresponding to the output still image data, for one output still image data or each of two or more pieces of output still image data respectively corresponding to the plurality of pieces of moving image data.

Then, the management marker registration unit 25 registers an image feature amount of each of a plurality of pieces of first output still image data obtained by selecting at least one piece of output still image data one by one from among output still image data corresponding to each of the plurality of pieces of moving image data or each of a plurality of first output still images corresponding to the plurality of pieces of first output still image data, as a first management marker, in association with the moving image data of the scene of the moving image corresponding to each of the plurality of first output still images.

Further, for each of the plurality of pieces of moving image data, the management marker registration unit 25 sets the output still image data as second output still image data and registers an image feature amount of a second output still image corresponding to the one piece of second output still image data or each of the two or more pieces of second output still image data, or one piece of second output still image data or each of the two or more pieces of second output still image data, as a second management marker, in association with moving image data of the scene of the moving image corresponding to the one second output still image or each of the two or more second output still images.

Then, the management image generation unit 28 generates first management image data including at least two pieces of first output still image data, and second management image data including at least one piece of second output still image data for each of the plurality of pieces of moving image data.

When the management image data is generated using five pieces of moving image data, for example, output still image data is selected from among the output still image data corresponding to the five moving image data one by one, and the first management image data including a total of five pieces of first output still image data is generated. Further, for each of the five moving image data, the second management image data including at least one piece of second still image data is generated using the output still image data as the second output still image data.

Next, an operation when the print of the first management image corresponding to the first management image data generated using a plurality of pieces of moving image data is captured and the scene of the moving image is reproduced will be described.

The print of the first management image corresponding to the first management image data is captured, and captured image data is generated by the imaging unit 11.

Then, the first management marker is read from the captured image corresponding to the captured image data by the management marker reading unit 12.

Here, for example, when one first output still image in the lower left is captured from among the five first output still images included in the print of the first management image by the imaging unit 11 as illustrated in the upper side of FIG. 22, the display control unit 14 performs control so that the second management image corresponding to the moving image data associated with the first management marker read from the captured one first output still image by the management marker reading unit 12 is displayed on the display unit 15. Accordingly, the second management image corresponding to the captured one first output still image is displayed on the display unit 15, as illustrated in the lower side of FIG. 22.

The same applies to an operation when another first output still image is captured from among the five first output still images included in the print of the first management image by the imaging unit 11.

Then, a user inputs an instruction to select one second output still image at the lower right on the lower side of FIG. 22 from among the second output still images included in the second management image displayed on the display unit 15 via the operation input unit 17.

When the one second output still image at the lower right on the lower right of FIG. 22 is selected from among the six second output still images included in the second management image displayed on the display unit 15 according to the instruction input via the operation input unit 17, the display control unit 14 performs control to reproduce, on the display unit 15, the scene of the moving image corresponding to the moving image data associated with the second management marker read from the selected one second output still image by the management marker reading unit 12. Accordingly, the scene of the moving image associated with the selected one second output still image is reproduced on the display unit 15.

The same applies to an operation when another second output still image is selected from among the six second output still images included in the second management image according to the instruction input via the operation input unit 17.

For example, when a moving image of an athletic meet for children is captured, since a moving image is captured for each event such as a footrace or a ball-toss game, a plurality of moving images including moving images for respective events are captured as moving images of the athletic meet. In the content management system of this embodiment, the plurality of moving images can be collected in the print of one first management image, and thus, the user can instantaneously grasp a digest of content of the plurality of moving images captured at the athletic meet or the like by viewing the print of the first management image.

Here, when a plurality of moving images are collected in a print of the one first management image, it is preferable for the management image generation unit 28 to change a display color of the first output still image according to the photographing date and time of the first output still image corresponding to the first output still image data included in the first management image data. For example, the color is changed into sepia or a monotone color from the newest photographing date and time to an old photographing date and time.

Accordingly, the user can recognize photographing order of the plurality of first output still images included in the print of the first management image, that is, the photographing order of the plurality of moving images.

When there are a plurality of first output still images corresponding to the moving image, for example, a first image among the plurality of first output still images corresponding to the moving image, that is, an image having the oldest photographing date and time among the plurality of first output still images may be used as the first output still image included in the first management image, but it is preferable to use the best image from among the plurality of first output still images corresponding to the moving image.

In this case, the management marker registration unit 25 can select the output still image of which the evaluation value calculated by the image evaluation unit 34 is highest from among the output still image data corresponding so each of the plurality of pieces of moving image data one by one, and obtain the plurality of pieces of first output still image data.

Accordingly, the user can easily recall the moving image associated with the first output still image by viewing the first output still image included in the first management image.

It is preferable for the display control unit 14 to perform control to change a display color of the second output still image according to the number of reproductions of the scene of the moving image corresponding to the second output still image included in the second management image displayed on the display unit 15. For example, the second output still image corresponding to the scene of the moving image of which the number of reproductions is large is maintained with an original color, and the second output still image corresponding to the scene of the moving image of which the number of reproductions is small is changed into sepia, a monotone color, or the like.

Accordingly, the user can recognize the scene of the moving image of which the number of reproductions is large, that is, a user's favorite scene of the moving image by viewing the display color of the second output still image included in the second management image.

In the respective embodiments described above, when the scene of the moving image is reproduced on the display unit 15, the display control unit 14 may cause the scene of the moving image to be AR-reproduced or normally-reproduced.

In the respective embodiments described above, it is not essential to generate the management image data including the access key, the embodiments are not limited thereto, and management image data including at least one output still image data and the access key may be generated and used when the scene of the moving image associated with the output still image is searched for.

In the embodiment illustrated in FIGS. 1 to 3, the still image extraction unit 33 may extract the still image data of a plurality of frames from the moving image data and automatically extract still image data of one still image corresponding to the best-shot scene from among the extracted still image data of the plurality of frames, instead of a user selecting one piece of still image data from among the still image data generated by the still image generation unit 22 by use of the still image selection unit 23. In this case, the access key may or may not be used.

In the device of the present invention, each component included in the device may be configured with a dedicated hardware or a programmed computer.

For example, the method of the present invention can be implemented by a program causing a computer to execute the respective steps of the method. Further, a computer-readable recording medium having this program recorded thereon can also be provided.

While the content management system, the management content generation method, and the management content reproduction method of the present invention have been described in detail, the present invention is not limited to the above-described embodiments, and may be improved or modified in various ways within a scope that does not depart from the gist of the present invention.

What is claimed is:

1. A content management system comprising a programmed computer, wherein the programmed computer comprises:
   a still image generation processor configured to generate at least one piece of still image data based on moving image data;
   a still image selection processor configured to cause a first user to select one piece of still image data from among the at least one piece of still image data generated in the still image generation processor;
   a management marker registration processor configured to register image content of a still image corresponding to the still image data selected in the still image selection processor or an image feature amount of the still image as a management marker in association with the moving image data;
   a storage configured to store moving image data acquired from a plurality of users including the first user;
   an access key issuing processor configured to issue an access key for limiting a range of moving image data being searched based on the management marker, from among the moving image data stored in the storage; and
   a management image generation processor configured to generate management image data including the still image data and the access key.

2. The content management system according to claim 1, further comprising:
   a first display configured to display a management image based on the management image data as a commercial image material or a printer configured to print the management image based on the management image data as the commercial image material.

3. The content management system according to claim 2, further comprising:
   a still image editing processor configured to perform editing processing on a still image based on the still image data selected in the still image selection processor to generate edited still image data,
   wherein the management marker registration processor registers image content of an edited still image corresponding to the edited still image data or an image feature amount of the edited still image as a management marker in association with the moving image data, wherein the image feature amount is based on edge information of the edited still image.

4. The content management system according to claim 2, further comprising:
   an imaging processor configured to capture the management image included in the commercial image material to generate captured image data;
   a management marker reading processor configured to read the management marker from a captured image based on the captured image data;
   an input processor configured to input the access key described in the management image included in the commercial image material;
   an image data search processor configured to limit a range of moving image data being searched based on the management marker from among the moving image data stored in the storage based on the access key, and search for moving image data corresponding to image content of the management image or an image feature amount of the management image from among the limited range of moving image data based on the management marker; and
   a second display configured to reproduce a moving image based on the moving image data searched for in the image data search processor.

5. The content management system according to claim 3, further comprising:
   an imaging processor configured to capture the management image included in the commercial image material to generate captured image data;
   a management marker reading processor configured to read the management marker from a captured image based on the captured image data;
   an input processor configured to input the access key described in the management image included in the commercial image material;
   an image data search processor configured to limit a range of moving image data being searched based on the management marker from among the moving image data stored in the storage based on the access key, and search for moving image data corresponding to image content of the management image or an image feature amount of the management image from among the limited range of moving image data based on the management marker; and
   a second display configured to reproduce the moving image based on the moving image data searched for in the image data search processor.

6. A content management system that manages management content including a management image and moving image data associated with the management image, the system comprising a programmed computer, wherein the programmed computer comprises:
   a still image generation processor configured to generate at least two pieces of still image data based on the moving image data;
   a still image selection processor configured to cause a first user to select two or more pieces of still image data among the at least two pieces of still image data generated in the still image generation processor, as output still image data;
   a scene discrimination processor configured to discriminate a scene of a moving image corresponding to a moving image data, the moving image including an output still image corresponding to the output still image data, for each of the two or more pieces of output still image data;
   a management marker registration processor configured to register image content of each of two or more output still images corresponding to the two or more pieces of output still image data or an image feature amount of each of the two or more output still images, as a management marker, in association with moving image data of the scene of the moving image corresponding to each of the two or more output still images;

a storage configured to store moving image data acquired from a plurality of users including the first user;

an access key issuing processor configured to issue an access key for limiting a range of moving image data being searched based on the management marker, from among the moving image data stored in the storage; and a management image generation processor configured to generate management image data including the at least two pieces of output still image data and the access key.

7. The content management system according to claim 6, further comprising:

an imaging processor configured to capture a print of the management image corresponding to the management image data to generate captured image data;

a management marker reading processor configured to read the management marker from a captured image corresponding to the captured image data;

an operation input processor configured to receive the access key, which is described in the print of the management image, input by the first user;

an image data search processor configured to limit a range of moving image data being searched based on the management marker from among the moving image data stored in the storage based on the access key input via the operation input processor, and search for moving image data corresponding to image content of the management image or an image feature amount of the management image from among the part limited range of moving image data based on the management marker;

a display configured to reproduce the moving image; and a display control processor configured to control the reproduction of the moving image in the display, wherein when one output still image is captured from among the output still images included in the print of the management image by the imaging processor, the display control processor performs control to reproduce, on the display, the scene of the moving image corresponding to the moving image data associated with the management marker read from the captured one output still image by the management marker reading processor from among the moving image data searched by the image data search processor.

8. The content management system according to claim 7, wherein when two or more output still images are simultaneously captured from among the output still images included in the print of the management image by the imaging processor, the display control processor performs control so that each of the scenes of the moving images corresponding to each of the two or more simultaneously captured output still images are simultaneously reproduced on the display.

9. The content management system according to claim 6, wherein the still image generation processor, the still image selection processor, and the scene discrimination processor repeatedly perform processing on each of the plurality of pieces of moving image data, the management marker registration processor registers image content of each of a plurality of first output still images corresponding to a plurality of pieces of first output still image data obtained by selecting at least one piece of output still image data one by one from among output still image data corresponding to each of the plurality of pieces of moving image data or an image feature amount of each of the plurality of first output still images, as a first management marker, in association with moving image data of the scene of the moving image corresponding to each of the plurality of first output still images; and for each of the plurality of pieces of moving image data, the management marker registration processor sets the output still image data as second output still image data and registers image content of one second output still image corresponding to one piece of second output still image data or each of two or more second output still images corresponding to each of two or more pieces of second output still image data, or an image feature amount of the one second output still image or each of the two or more second output still images, as a second management marker, in association with moving image data of the scene of the moving image corresponding to the one second output still image or each of the two or more second output still images, and the management image generation processor generates first management image data including at least two pieces of first output still image data and the access key, and second management image data including at least one piece of second output still image data for each of the plurality of pieces of moving image data.

10. The content management system according to claim 9, further comprising:

an imaging processor configured to capture a print of a first management image corresponding to the first management image data to generate captured image data;

a management marker reading processor configured to read the first management marker from a captured image corresponding to the captured image data;

an operation input processor configured to receive an access key, which is described in the print of the management image, input by a first user;

an image data search processor configured to limit a range of moving image data being searched based on the management marker from among the moving image data stored in the storage based on the access key input via the operation input processor, and search for moving image data corresponding to image content of the first management image or an image feature amount of the first management image from among the limited range of moving image data based on the management marker;

a display configured to reproduce the moving image; and a display control processor configured to control the reproduction of the moving image in the display, wherein when one first output still image is captured from among the first output still images included in the print of the first management image by the imaging processor, the display control processor performs control to display, on the display, a second management image corresponding to the moving image data associated with the first management marker read from the captured one first output still image by the management marker reading processor from among the moving image data searched by the image data search processor, and when one second output still image is selected from among the second output still images included in the second management image displayed on the display according to an instruction input via the operation input processor, the display control processor performs control to reproduce, on the display, the scene of the moving image corresponding to the moving image data associated with the second management marker read from the one second selected output still image by the management marker reading processor from among the moving image data searched by the image data search processor.

11. A method of generating management content including a management image and moving image data associated with the management image, the method comprising:
generating at least one piece of still image data based on the moving image data;
causing a first user to select one piece of still image data from among the at least one generated still image data;
registering image content of a still image corresponding to the selected still image data or an image feature amount of the still image as a management marker in association with the moving image data;
issuing an access key for limiting a range of moving image data being searched based on the management marker, from among the moving image data acquired from a plurality of users including the first user based on an instruction from the first user; and
generating the management image including the still image data and the access key.

12. The method of generating management content according to claim 11, further comprising:
further performing editing processing on a still image based on the selected still image data to generate edited still image data, and
registering image content of an edited still image corresponding to the edited still image data or an image feature amount of the edited still image as a management marker in association with the moving image data, wherein the image feature amount is based on edge information of the edited still image.

13. A management content reproduction method that reproduces management content generated using the method of generating management content according to claim 11, the management content reproduction method comprising:
capturing the management image to generate captured image data;
reading the management marker from a captured image based on the captured image data;
inputting the access key described in the management image;
limiting a range of moving image data being searched based on the management marker from among the moving image data acquired from a plurality of users including the first user based on the access key;
searching for moving image data corresponding to image content of the management image or an image feature amount of the management image from among the limited range of moving image data based on the management marker; and
reproducing the moving image based on the searched moving image data, wherein the image feature amount is based on edge information of the edited still image.

14. A management content reproduction method that reproduces management content generated using the method of generating management content according to claim 12, the management content reproduction method comprising:
capturing the management image to generate captured image data;
reading the management marker from a captured image based on the captured image data;
inputting the access key described in the management image;
limiting a range of moving image data being searched based on the management marker from among the moving image data acquired from a plurality of users including the first user based on the access key;
searching for moving image data corresponding to image content of the management image or an image feature amount of the management image from among the limited range of moving image data based on the management marker; and
reproducing the moving image based on the searched moving image data.

15. A method of generating management content including a management image and moving image data associated with the management image, the method comprising:
a step of, with a still image generation processor, generating at least two pieces of still image data based on the moving image data;
a step of, with a still image selection processor, causing a first user to select two or more pieces of still image data as output still image data from among the at least two pieces of still image data generated in the still image generation processor;
a step of, with a scene discrimination processor, discriminating a scene of the moving image corresponding to the moving image data, the moving image including an output still image corresponding to the output still image data, for each of the two or more pieces of output still image data;
a step of, with a management marker registration processor, registering image content of each of two or more output still images corresponding to the two or more pieces of output still image data or an image feature amount of each of the two or more output still images, as a management marker, in association with moving image data of the scene of the moving image corresponding to each of the two or more output still images;
a step of, with an access key issuing processor, issuing an access key for limiting a range of moving image data being searched based on the management marker, from among the moving image data acquired from a plurality of users including the first user and stored in a storage; and
a step of, with a management image generation processor, generating management image data including the at least two pieces of output still image data and the access key.

16. A management content reproduction method that reproduces management content generated using the method of generating management content according to claim 15, the management content reproduction method comprising:
a step of, with an imaging processor, capturing a print of the management image corresponding to the management image data to generate captured image data;
a step of, with a management marker reading processor, reading the management marker from a captured image corresponding to the captured image data;
a step of, with an operation input processor, receiving the access key, which is described in the print of the management image, input by a first user;
a step of, with an image data search processor, limiting a range of moving image data being searched based on the management marker from among the moving image data stored in the storage based on the access key input via the operation input processor, and search for moving image data corresponding to image content of the management image or an image feature amount of the management image from among the limited range of moving image data based on the management marker; and a step of, when one output still image is captured from among the output still images included in the print of the management image by the imaging processor, with a display control processor, performing control to reproduce, on a display, the scene of the moving image corresponding to the moving image data associated with a management marker read from the captured one output still image by the management marker reading processor from among the moving image data searched by the image data search processor.

17. A method of generating management content including a management image and moving image data associated with the management image, the method comprising:

a step of, with a still image generation processor, generating at least two pieces of still image data based on the moving image data;

a step of, with a still image selection processor, causing a first user to select one piece of still image data or two or more pieces of still image data as output still image data from among the at least two pieces of still image data generated in the still image generation processor;

a step of, with a scene discrimination processor, discriminating a scene of the moving image including the output still image corresponding to the output still image data, for the one output still image data or each of the two or more pieces of output still image data;

a step of, with the still image generation processor, the still image selection processor, and the scene discrimination processor, repeatedly performing processing on each of the plurality of pieces of moving image data;

a step of, with a management marker registration processor, registering image content of each of a plurality of first output still images corresponding to a plurality of pieces of first output still image data obtained by selecting at least one piece of output still image data one by one from among output still image data corresponding to each of the plurality of pieces of moving image data or an image feature amount of each of the plurality of first output still images, as a first management marker, in association with moving image data of the scene of the moving image corresponding to each of the plurality of first output still images, and for each of the plurality of pieces of moving image data, the management marker registration processor sets the output still image data as second output still image data and registering image content of one second output still image corresponding to one piece of second output still image data or each of two or more second output still images corresponding to each of two or more pieces of second output still image data, or an image feature amount of the one second output still image or each of the two or more second output still images, as a second management marker, in association with moving image data of the scene of the moving image corresponding to the one second output still image or each of the two or more second output still images;

a step of, with an access key issuing processor, issuing an access key for limiting a range of moving image data being searched based on the management marker, from among the moving image data acquired from a plurality of users including the first user and stored in a storage; and a step of, with a management image generation processor, generating first management image data including at least two pieces of first output still image data and the access key, and second management image data including at least one piece of second output still image data for each of the plurality of pieces of moving image data.

18. A management content reproduction method that reproduces management content generated using the method of generating management content according to claim 17, the method comprising:

a step of, with an imaging processor, capturing a print of a first management image corresponding to the first management image data to generate captured image data;

a step of, with a management marker reading processor, reading the first management marker from a captured image corresponding to the captured image data;

a step of, with an operation input processor, receiving the access key, which is described in the print of the first management image, input by a first user;

a step of, with an image data search processor, limiting a range of moving image data being searched based on the management marker from among the moving image data stored in a storage based on the access key input via the operation input processor, and search for moving image data corresponding to image content of the first management image or an image feature amount of the first management image from among the limited range of moving image data based on the management marker;

a step of, when one first output still image is captured from among first output still images included in the print of the first management image by the imaging processor, with a display control processor, performing control to display, on a display, a second management image corresponding to the moving image data associated with the first management marker read from the captured one first output still image by the management marker reading processor from among the moving image data searched by the image data search processor;

a step of, with the operation input processor, receiving an instruction to select one second output still image from among second output still images included in the second management image displayed on the display, input by the first user;

a step of, with the management marker reading processor, reading the second management marker from the selected one second output still image; and a step of, when one second output still image is selected from among the second output still images included in the second management image displayed on the display according to the instruction input via the operation input processor, with the display control processor, performing control to reproduce, on the display, the scene of the moving image corresponding to the moving image data associated with the second management marker read from the selected one second output still image by the management marker reading processor from among the moving image data searched by the image data search processor.

19. A non-transitory computer-readable recording medium having a program recorded thereon, the program causing a computer to execute the respective steps of the management content generation method according to claim 11.

20. A non-transitory computer-readable recording medium having a program recorded thereon, the program causing a computer to execute the respective steps of the management content reproduction method according to claim 13.

21. The content management system according to claim 1, wherein the management marker registration processor is configured to register the image content of the still image corresponding to the still image data selected in the still image selection processor, as the management marker in association with the moving image data.

22. The content management system according to claim 1, wherein the management marker registration processor is configured to register the image content of the still image corresponding to the image feature amount of the still image, as the management marker in association with the moving image data, the image feature amount being based on edge information of the edited still image.

* * * * *